(12) United States Patent
Nogata et al.

(10) Patent No.: US 8,770,824 B2
(45) Date of Patent: *Jul. 8, 2014

(54) EXTRUDER AND PROCESS FOR PREPARING A MIXTURE OF POLYMER AND DILUENT

(75) Inventors: Tetsuro Nogata, Kanagawa-ken (JP);
Soichiro Yamaguchi, Kanagawa (JP);
Norimitsu Kaimai, Kanagawa-ken (JP);
Kotaro Takita, Kanagawa (JP); Junko Takita, legal representative, Kanagawa-ken (JP)

(73) Assignee: Toray Battery Separator Film Co., Ltd. (JP)

( * ) Notice: Subject to any disclaimer, the term of this patent is extended or adjusted under 35 U.S.C. 154(b) by 1051 days.

This patent is subject to a terminal disclaimer.

(21) Appl. No.: 12/681,695

(22) PCT Filed: Oct. 20, 2008

(86) PCT No.: PCT/JP2008/069387
§ 371 (c)(1),
(2), (4) Date: Nov. 19, 2010

(87) PCT Pub. No.: WO2009/051280
PCT Pub. Date: Apr. 23, 2009

(65) Prior Publication Data
US 2011/0089602 A1    Apr. 21, 2011

Related U.S. Application Data

(60) Provisional application No. 60/981,279, filed on Oct. 19, 2007, provisional application No. 60/981,218, filed on Oct. 19, 2007, provisional application No. 60/985,028, filed on Nov. 2, 2007, provisional application No. 60/986,748, filed on Nov. 9, 2007.

(30) Foreign Application Priority Data

Apr. 24, 2008   (EP) ..................... 0815514

(51) Int. Cl.
*B29C 47/40*   (2006.01)

(52) U.S. Cl.
USPC ............... 366/76.6; 366/82; 366/84; 366/85; 425/204

(58) Field of Classification Search
USPC ................ 366/76.6, 82, 84, 85; 425/204
See application file for complete search history.

(56) References Cited

U.S. PATENT DOCUMENTS

| 5,358,693 | A | * | 10/1994 | Brinkmann et al. | .......... 422/137 |
| 5,573,332 | A | | 11/1996 | Weihrich et al. | |
| 6,010,723 | A | | 1/2000 | Song et al. | |
| 6,062,719 | A | | 5/2000 | Busby et al. | |
| 2002/0060378 | A1 | | 5/2002 | Miyamoto et al. | |

(Continued)

FOREIGN PATENT DOCUMENTS

| JP | 07-216118 | 8/1995 |
| JP | 08-109268 | 4/1996 |

(Continued)

*Primary Examiner* — David Sorkin
(74) *Attorney, Agent, or Firm* — DLA Piper LLP (US)

(57) ABSTRACT

The invention relates to a twin screw extruder for preparing a polymeric solution. The extruder includes an elongated housing having an inlet end, an outlet end, an extruder shaft length L and a pair of interconnecting bores disposed within the housing, a pair of elongated extruder shafts, each having an axis of rotation, the pair of elongated extruder shafts disposed within the pair of interconnecting bores and drivable in at least one direction of rotation, a plurality of extruder screw segments positioned along the pair of elongated extruder shafts in a fixed angular relationship therewith, the plurality of extruder screw segments selected to form multiple extruder stages. The invention also relates to a process for extruding a mixture of polymer and diluent.

5 Claims, 5 Drawing Sheets

(56) References Cited

U.S. PATENT DOCUMENTS

| | | |
|---|---|---|
| 2004/0209977 A1 | 10/2004 | Hossan |
| 2005/0013192 A1 | 1/2005 | Kakizaki et al. |
| 2007/0083035 A1 | 4/2007 | Riding et al. |

FOREIGN PATENT DOCUMENTS

| | | |
|---|---|---|
| JP | 08-120093 | 5/1996 |
| JP | 08-164518 | 6/1996 |
| JP | 08-224735 | 9/1996 |
| JP | 08-245798 | 9/1996 |
| JP | 2000/037764 | 2/2000 |
| JP | 2003/053821 | 2/2003 |
| WO | WO03/020483 | 3/2003 |
| WO | WO 2004/089627 | 10/2004 |
| WO | WO 2005/113657 | 12/2005 |

* cited by examiner

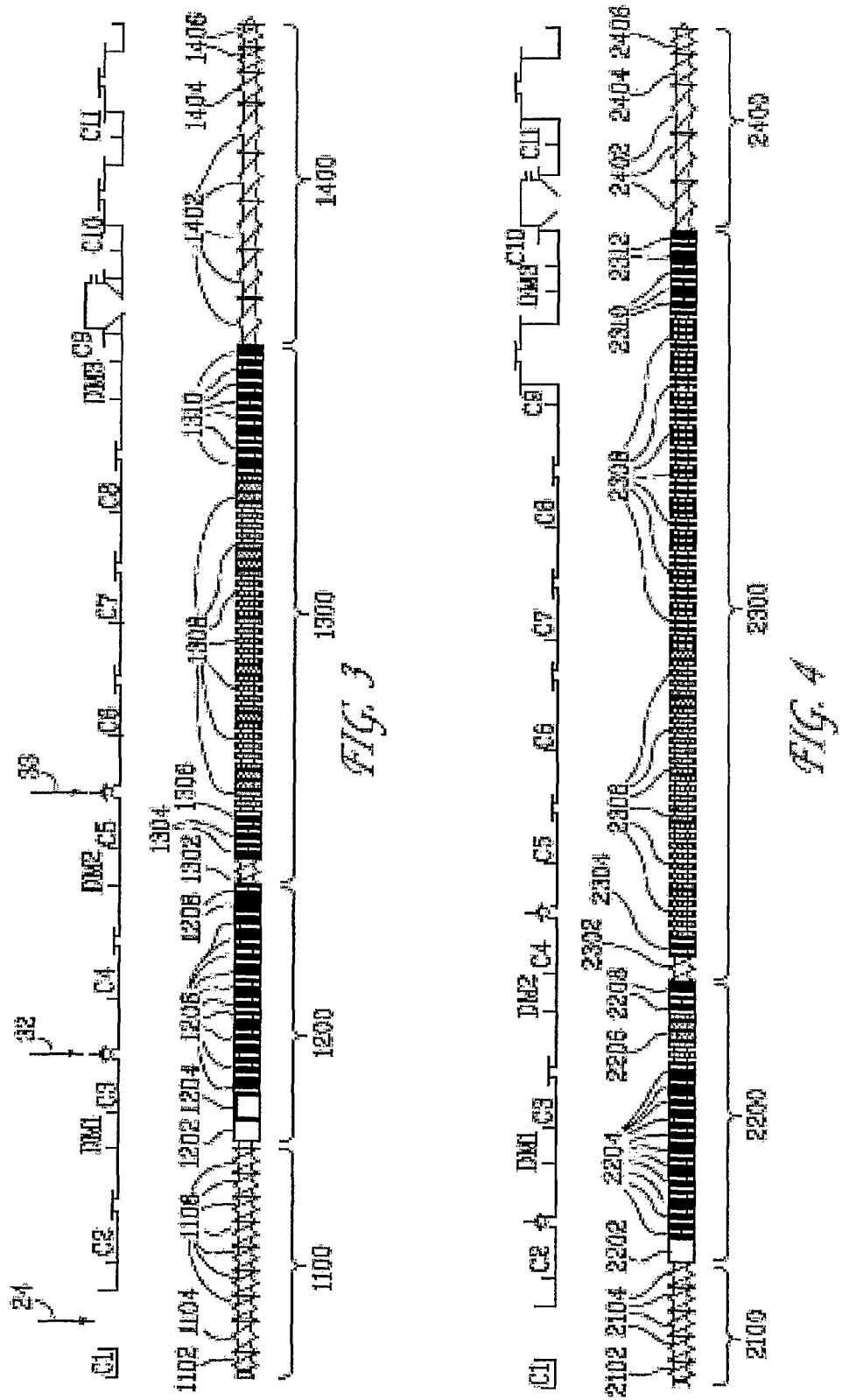

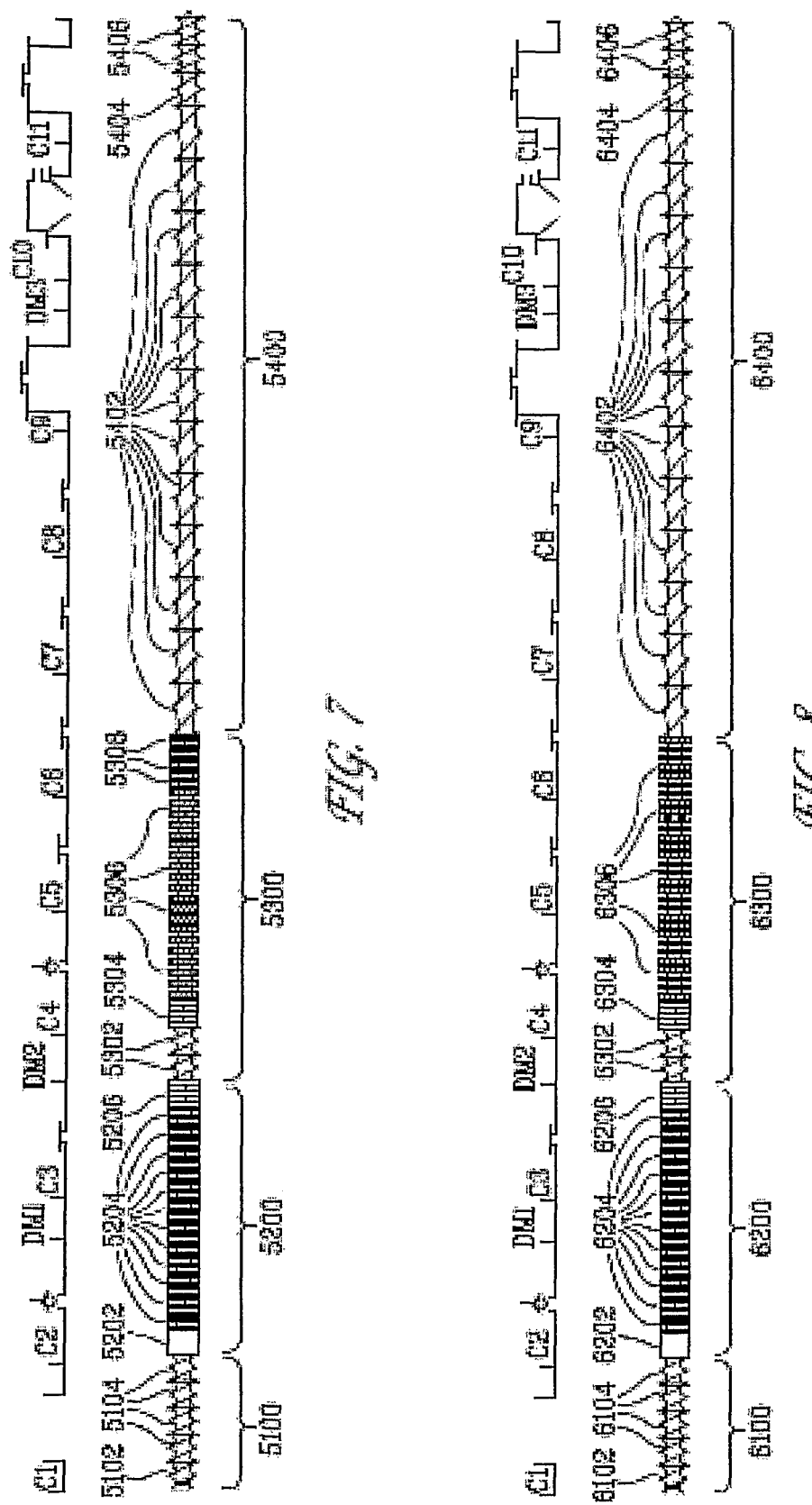

EXTRUDER AND PROCESS FOR PREPARING A MIXTURE OF POLYMER AND DILUENT

CROSS REFERENCE TO RELATED APPLICATIONS

This application is a 371 National Stage Application of International Application No. PCT/JP2008/069387, filed Oct. 20, 2008, which claims the benefit of EP 08155114.5, filed Apr. 24, 2008, U.S. Provisional Application Ser. No. 60/981,279, filed Oct. 19, 2007, U.S. Provisional Application Ser. No. 60/986,748, filed Nov. 9, 2007, U.S. Provisional Application Ser. No. 60/981,218, filed Oct. 19, 2007, and U.S. Provisional Application Ser. No. 60/985,028, filed Nov. 2, 2007, the disclosures of which are herein incorporated by reference in their entireties.

FIELD OF THE INVENTION

This disclosure relates generally to an extruder for preparing a mixture of polymer and diluent, and, more particularly, to extruder screw configurations for use therein. Such mixtures are useful for producing microporous films, such as those used as battery separator film.

BACKGROUND OF THE INVENTION

In the processing of polymeric resins and other materials, extruders are commonly employed for the plastication, mixing and pumping of such materials. In their simplest form, extruders include a frame designed to be bolted to a concrete floor, a barrel mounted to the frame, and, in the case of a twin screw extruder, two interconnecting bores extending longitudinally from one end of the barrel to the other. A twin screw extruder also includes two intermeshing screws located within the two interconnecting bores and drive means for turning the screws in the same (co-rotating) or opposite (counter-rotating) direction.

Polymeric materials are useful for the fabrication of a variety of films, sheets and molded or shaped articles. As is well-known to those skilled in the art, plastication refers to the softening of a polymeric material to such an extent that it flows freely and will assume any shape. In the case of a polymeric material that is crystalline, plastication is synonymous with melting. In the case of a polymeric material that is amorphous, plastication occurs at or about the glass transition temperature ($T_g$) thereof.

An extruder screw is shaped generally in the form of an elongated cylinder, and has one or more raised ridges helically disposed thereabout, each of which is a commonly referred to as a flight. A flight may have forward, reverse or neutral pitch, with the degree of pitch varied to accommodate a particular application. The surface of the screw above which the flight is raised is commonly referred to as the root of the screw. When the screw is viewed in cross section, the course of a particular flight, between one point of intersection with a line parallel to the screw axis and the next closest point of intersection of the flight with such line, typically defines a 360° circle. The tip of a flight, which extends toward the perimeter of such circular-shaped cross section, defines a lobe above the root of the screw. The space bounded by the root of the screw and the side walls of any two flights is a channel of the screw. The screw rotates on its longitudinal axis within a barrel or sleeve, which may be generally described as the bore of an annular cylinder.

The screw typically has an initial, feed section which begins the process of conveying solid polymeric material forward within the barrel of the extruder. Polymeric material may be fed into the extruder by means of a hopper which empties into the barrel, or may be metered into the barrel through a feed chute or a side feeder. The direction of travel of the polymeric material in the barrel as it is transported away from the feed port by the screw is known as the downstream direction. In the case of the extrusion of polymer melts, the feed or inlet section of the screw is typically followed, with or without other intervening sections, by a melting section in which partial or complete plastication of the polymeric material occurs.

The melting section of the screw is typically followed, with or without other intervening sections, by a metering section which functions to pump the material, as extrudate, out through the downstream end of the extruder, which typically contains a die or some other form of restricted orifice. The sections of the extruder and screw through which the polymeric material travels before it reaches the die are considered to be upstream from the die.

With respect to a twin screw extruder, two screws are said to be intermeshing if a flight of one screw is disposed within a channel of the other screw. In such a configuration, the distance between the axes of each screw is less than the sum of the respective radii of the two screws, when each radius is measured from the axis to the top of the tallest or highest flight of the screw. When, on a pair of screws, a flight has a shape and size such that its fit into a channel in which it is intermeshed is close enough that essentially no extrudable material passes through the space between the flight and channel, the screws are said to be conjugated. Otherwise, the screws are said to be non-conjugated, and the degree of intermeshing in the case of non-conjugation can be varied to an essentially unlimited extent.

Co-rotating screws, even when conjugated, allow for extensive movement of polymeric material laterally from one screw to the other. Mixing is benefited by this movement and it is further enhanced when the screws are not conjugated. The shape of the flights on non-conjugated screws may be arranged to create the passage of polymeric material from one channel into two channels on another screw. Or, when screws are conjugated, or essentially conjugated, certain flights can be designed in a shape such that they wipe each other in the zone of intermeshing but do not wipe the wall of the barrel.

The production of certain specialty films, such as microporous membranes has presented unique requirements in the design of extruders for their production. This is due in large part by the need to introduce a large amount of a solvent or diluent for the polymeric raw material, e.g., polyolefin resin, so that a polymeric solution (which can also be called a polymeric resin solution) is prepared for subsequent extrusion. Microporous membranes are useful as separators for primary batteries and secondary batteries such as lithium ion secondary batteries, lithium-polymer secondary batteries, nickel-hydrogen secondary batteries, nickel-cadmium secondary batteries, nickel-zinc secondary batteries, silver-zinc secondary batteries, etc. When the microporous membrane is used as a battery separator, particularly as a lithium ion battery separator, the membrane's performance significantly affects the properties, productivity and safety of the battery. Accordingly, the microporous membrane should have suitably well-balanced permeability, mechanical properties, dimensional stability, shutdown properties, meltdown properties, etc. The term "well-balanced" means that the optimization of one of these characteristics does not result in a significant degradation in another.

As is known, it is desirable for the batteries to have a relatively low shutdown temperature and a relatively high meltdown temperature for improved battery safety, particularly for batteries exposed to high temperatures under operating conditions. Consistent dimensional properties, such as film thickness, are essential to high performing films. A separator with high mechanical strength is desirable for improved battery assembly and fabrication, and for improved durability. The optimization of material compositions, casting and stretching conditions, heat treatment conditions, etc. have been proposed to improve the properties of microporous membranes.

In general, microporous polyolefin membranes consisting essentially of polyethylene (i.e., they contain polyethylene only with no significant presence of other species) have relatively low meltdown temperatures. Accordingly, proposals have been made to provide microporous polyolefin membranes made from mixed resins of polyethylene and polypropylene, and multi-layer, microporous polyolefin membranes having polyethylene layers and polypropylene layers in order to increase meltdown temperature. The use of these mixed resins and the production of multilayer films having layers of differing polyolefins can make the production of films having consistent dimensional properties, such as film thickness, all the more difficult.

U.S. Pat. No. 5,573,332 proposes a screw element for a screw-type extrusion machine. The screw elements are helical and have varying pitch directions. Lengthwise mixing is obtained by the screwing in opposite directions, whereas crosswise mixing is attained by the elongated wedge of the flank arc. This crosswise flow is a typical continuous shear flow, which is primarily a dispersive mixing operation. Dividing the flow into various partial flows, recirculation and offset combination do not take place. The extruder proposed is for use in preparing a polymer melt and does not relate to the field of polymer solution extrusion.

U.S. Pat. No. 6,062,719 proposes a co-rotating multiple-screw extruder comprising first and second intermeshing screws of more than one flight. The first screw comprises first and second segments paired with first and second segments of the second screw, respectively. On the first segment of the first screw, the height of the first flight is less than the height of the second flight and on the second segment of the second screw, the height of the first flight is less than the height of the second flight and screws for use in such extruder. The extruder proposed is for use in preparing a polymer melt and does not relate to the field of polymer solution extrusion.

U.S. Publication No. 20050013192 proposes a kneading disk having a plurality of disk elements having flight tips arranged at a helix angle E in a direction supporting main streams of a resin. The flight tips of every two adjoining disks have a clearance formed therebetween. The resin is kneaded by undergoing dispersion and distribution without having any excessive temperature elevation in approximately three kinds of streams, i.e. its main streams flowing along the flight tips, its back streams through the clearances and its tip riding streams flowing over the flight tips. The reference discloses a continuous or "rotor"-type screw segment in the "dispersion" region of the extruder for improved melt-shearing in that region. When distribution or "stirring" in needed, a discontinuous or "disk-type" segment having disk elements arranged along a screw axis and flight tips arranged discontinuously and helically in parallel to the screw axis is employed. Polymer flowing counter-currently in the regions between the flight tips (see, e.g., FIG. 7) increases polymer residence time to increase mixing uniformity. With conventional screw segments, the L/D value is small and multiple segments are needed to get good dispersion. This however leads to a problem since, at the interface between two segments in registry, what is effectively produced is a lobe that is twice as long as the interior lobes. This abruptly changes the "pitch" of the flight of lobes. Moreover, the total number of lobes is reduced by the number of segment interfaces. All of these effects serve to reduce the amount of beneficial countercurrent polymer flow.

JP7-216118A discloses a battery separator formed from a porous film comprising polyethylene and polypropylene as indispensable components and having at least two microporous layers each with different polyethylene content. The polyethylene content is 0 to 20% by weight in one microporous layer, 21 to 60% by weight in the other microporous layer, and 2 to 40% by weight in the overall film. The battery separator has relatively high shutdown-starting temperature and mechanical strength. Since this is a "dry" process, the resins are combined as a polymer melt and then extruded.

WO 2004/089627 discloses a microporous polyolefin membrane made of polyethylene and polypropylene comprising two or more layers, the polypropylene content being more than 50% and 95% or less by mass in at least one surface layer, and the polyethylene content being 50 to 95% by mass in the entire membrane. The membrane is made in a wet process, where polymer and a plasticizer are combined by melt blending in a double screw mixer for example. Generally, it is advantageous to combine the polymer first in an inlet stage where the polymer resins can be blended or distributed amongst themselves before adding the plasticizer.

WO 2005/113657 discloses a microporous polyolefin membrane having conventional shutdown properties, meltdown properties, dimensional stability and high-temperature strength. The membrane is made using a polyolefin composition comprising (a) composition comprising lower molecular weight polyethylene and higher molecular weight polyethylene, and (b) polypropylene. This microporous polyolefin membrane is produced by a so-called "wet process".

As those skilled in the art will plainly recognize, extruder screw design requirements for extruding polymer melts differ greatly from those relating to polymer solutions. While much work has been conducted with respect to polymer melts, this work largely fails to translate to the field of polymer (particularly polyolefin) solution extrusion. Since polyolefin solutions behave differently from polymer melts, those skilled in the art recognize that there is no expectation that a combination of extruder screw segments used for extruding a polymer melt will yield satisfactory performance when extruding a polymer solution. As may be appreciated by those working in the field of polymeric solution extrusion, a counter current flow of the solvent or diluent phase in the extruder can be (and generally is) undesirable. As such, it is desirable to have no significant amount of solvent (preferably none) in the inlet stage of an extruder, since even a small amount of solvent would interfere with polymer blending as a result of the much lower viscosity of the solvent compared to the polymer.

A further problem relating to the extrusion of polymer solutions involves the fact that the knowledge base relating thereto is limited. While it is generally recognized that single and twin-screw extruders can be used, information as to which particular extruder segments or combinations of segments have utility is very limited.

JP 2003-053821 discloses a wet process for manufacturing a microporous film where a polyolefin solution is extruded through a twin-screw extruder and each screw contains at least one of (a) a normal screw-notch screw element, (b) a reverse screw-notch screw element, and (c) a collar. This arrangement is said to benefit the mixing of different kinds and molecular weight polymers. As may be appreciated, the problems identified with respect to U.S. Publication No. 2005/0013192 (too little countercurrent flow of polymer, leading to shorter residence time in the extruder and, consequently, incomplete kneading) are addressed by the introduction of a reverse-pitch segment.

JP Publication Nos. 8-109268, 8-120093, 8-164518, 8-224735, 8-245798 and B-109268 each relate to the field of polymeric solution extrusion. While having an upstream pressure greater than the pressure at the point of solvent injection may be proposed, no teaching as to how this may be achieved is disclosed within any of the aforementioned publications.

Despite these advances in the art, there remains a need for improved extrusion systems capable of producing high quality microporous polyolefin membranes and other films or sheets from polymer solutions.

SUMMARY OF THE INVENTION

In one aspect, provided is a twin screw extruder for preparing a mixture of polymer and diluent, e.g., a polymeric solution. The extruder includes an elongated housing having an inlet end, an outlet end, an extruder shaft length L and a pair of interconnecting bores disposed within the housing, a pair of elongated extruder shafts, each having an axis of rotation, the pair of elongated extruder shafts disposed within the pair of interconnecting bores and drivable in at least one direction of rotation, a plurality of extruder screw segments positioned along the pair of elongated extruder shafts in a fixed angular relationship therewith, the plurality of extruder screw segments selected to form multiple extruder stages, the multiple extruder stages comprising an inlet stage having a length Li of about 5% L≤Li≤about 30% L, and a dispersion stage having a length Ld of about 10% L≤Ld≤about 35% L, a material inlet adjacent the inlet end of the elongated barrel for introducing at least one polymer and a first fluid inlet located within the dispersion stage for introducing at least one diluent. In other words, the inlet stage has a length Li in the range of about 5% to about 30% of the length of the extruder, and a dispersion stage having a length Ld in the range of about 10% to about 35% of the length of the extruder shaft (L).

In another aspect, provided is a process for extruding a mixture of polymer and diluent. The process includes the steps of blending at least one polymer at a rate of P grams per second in an inlet stage of an extruder the inlet stage having a pressure at its downstream end and conducting the blended polymer to a dispersion stage of the extruder, and adding at least one diluent to the blended polymer in the dispersion stage through a first fluid inlet at a rate of S (measured, e.g., in grams per second), the diluent having a lower viscosity than the polymer, dispersing the diluent in the polymer, and conducting the dispersed diluent to a mixing stage of the extruder wherein the pressure at the first fluid inlet of the dispersion stage is lower than the pressure at the downstream end of the inlet stage and wherein the pressure downstream of the first fluid inlet is less than both the pressure at the first fluid inlet and the pressure at the downstream end of the inlet stage.

In an exemplary form disclosed herein, the twin screw extruder further includes a mixing stage having a length Lm of about 15%≤Lm≤about 60% of the total length of the extruder shaft, and an outlet stage having a length Lo of about 0%≤Lo≤about 55% of the total length of the extruder shaft.

In another exemplary form the inlet stage has a length of about 15%≤L≤about 25% of the total length of the extruder, the dispersion stage has a length Ld of about 15%≤Ld≤about 25% of the total length of the extruder shaft, the mixing stage has a length Lm of about 35%≤Lm≤about 45% of the total length of the extruder shaft, and the outlet stage has a length of about 20%≤L≤about 30% of the total length of the extruder shaft.

In another exemplary form disclosed herein, the dispersion stage includes eleven forward kneading segments, each having a length of 0.50D, and two neutral kneading segments, each having a length of 0.50D.

In yet another exemplary form disclosed herein, the mixing stage includes a full flight screw segment, having a length of 0.75D, a pair of neutral kneading segments, each having a length of 0.50D, a forward kneading segment having a length of 0.50D, a plurality of gear kneading segments, each having a length of 1.50D, and a plurality of forward kneading segments.

In still yet another exemplary form disclosed herein, the inlet stage includes a first forward full flight screw segment having a length of 0.75D, a second forward full flight screw segment having a length of 1.00D, and six third forward full flight screw segments, each having a length of 0.75D.

In a further exemplary form disclosed herein, the outlet stage includes five first forward full flight screw segments, each having a length of 1.50D, a second forward full flight screw segment having a length of 1.00D, and a pair of third forward full flight screw segments, each having a length of 0.75D.

In a yet further exemplary form disclosed herein, the elongated extruder shafts are co-rotating.

In a still yet further exemplary form disclosed herein, the elongated extruder shafts are counter-rotating.

In another exemplary form disclosed herein, the process further includes the steps of extruding the polymer-diluent mixture through an extrusion die, the extrusion die comprising a die outlet, e.g., a slotted die outlet, through which a stream of the polymer-diluent mixture is extruded; and cooling the extrudate to form a cooled extrudate.

These and other advantages, features and attributes of the disclosed extruder and process and its advantageous applications and/or uses will be apparent from the detailed description that follows, particularly when read in conjunction with the figures appended hereto.

BRIEF DESCRIPTION OF THE DRAWINGS

FIG. 3 is a schematic of a screw segment configuration for preparing a polymer solution, in accordance herewith;

FIG. 4 is a schematic of another screw segment configuration for preparing a polymer solution, in accordance herewith;

FIG. 7 is a schematic of further screw segment configuration for preparing a polymer solution, in accordance herewith; and FIG. 8 is a schematic of a still further screw segment configuration for preparing a polymer solution, in accordance herewith.

DETAILED DESCRIPTION OF THE INVENTION

Definitions

By "forward flight screw segment" is meant a continuous conveying element having a flight angle sufficient to cause flow in a direction from the inlet end to the outlet end of the extruder. Suitable forward flight screw segments may be obtained from Japan Steel Works of Tokyo, Japan, and may include segments such as H259, H261, H262 and H265.

By "forward screw segment" is meant a screw element with a flight pitch designed to convey material forward to the screw segment ahead of it.

By "gear kneading segment" is mean a screw segment having a plurality of gear-like kneading disks. Suitable gear kneading segments may be obtained from Japan Steel Works of Tokyo, Japan, and may include neutral gear kneading segments such as H726 and H727.

By "kneading segment" is meant a screw segment that may be continuous or discontinuous. Examples of discontinuous kneading segments include single and dual flight kneading segments having a plurality of lobed kneading disks and gear kneading segments having a plurality of gear-like kneading disks. The length or thickness of the kneading disks typically range between a few to a several millimeters, for example from 2 mm to 100 mm, depending on the required dispersion rate of mixing. A continuous kneading segment may have the shape of a continuous conveying element with a flight angle of 90° so as to cause no flow in either direction.

By "reverse screw segment" is meant a screw element with a pitch designed to convey material back to the screw segment preceding it, creating a filled barrel section.

By "screw configuration" is meant the general profile of the screw resulting from the change of its geometric characteristics and/or the organization of successive screw segments, insuring different functions are performed along its length.

By "segment" or "screw segment" is meant an extrusion screw element, positioned along a keyed or splined shaft, which conveys, shears, pressurizes, heats and/or transforms materials into a continuous solution or mass. Such elements may be of the conveying type or non-conveying or kneading type.

By "single flight" or "dual flight kneading segment" is meant a kneading segment having a plurality of lobed kneading disks. Suitable single flight or dual flight kneading segments may be obtained from Japan Steel Works of Tokyo, Japan, and may include forward kneading segments such as H266 and H267, reverse kneading segments, such as H299, or neutral kneading segments, such as H294 and H306 which are compatible with extruder such as TEX-65.

By "twin screw extruder" is meant a machine having two parallel screw shafts running side by side in a double-bored barrel for the mixing and processing of products, such as polymeric solutions.

Reference is now made to FIGS. 1-8, wherein like numerals are used to designate like parts throughout.

Figure 1:
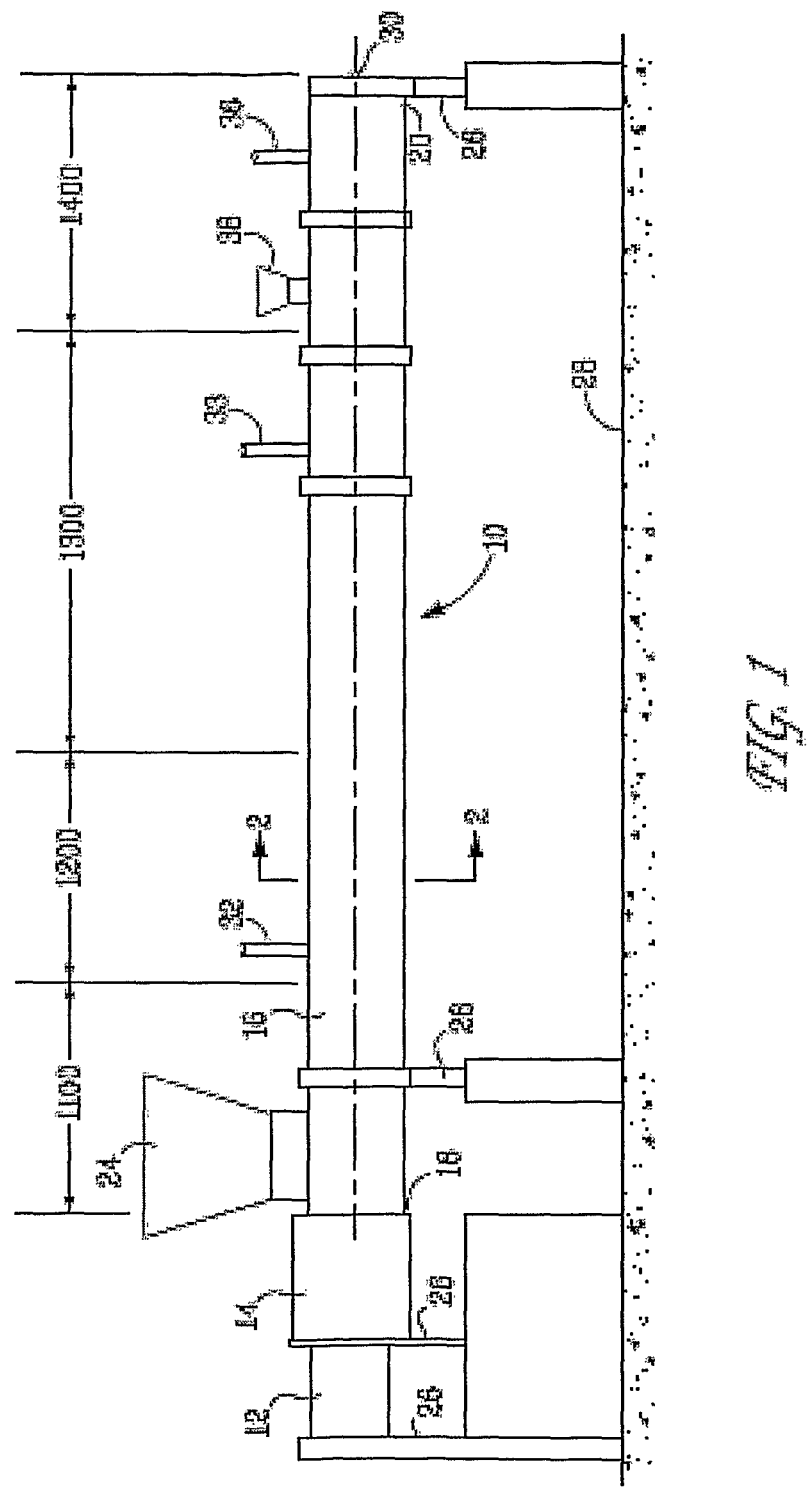
FIG. 1 is a diagrammatic illustration of a lateral longitudinal view of a twin screw extruder, in accordance herewith.
Figure 2:
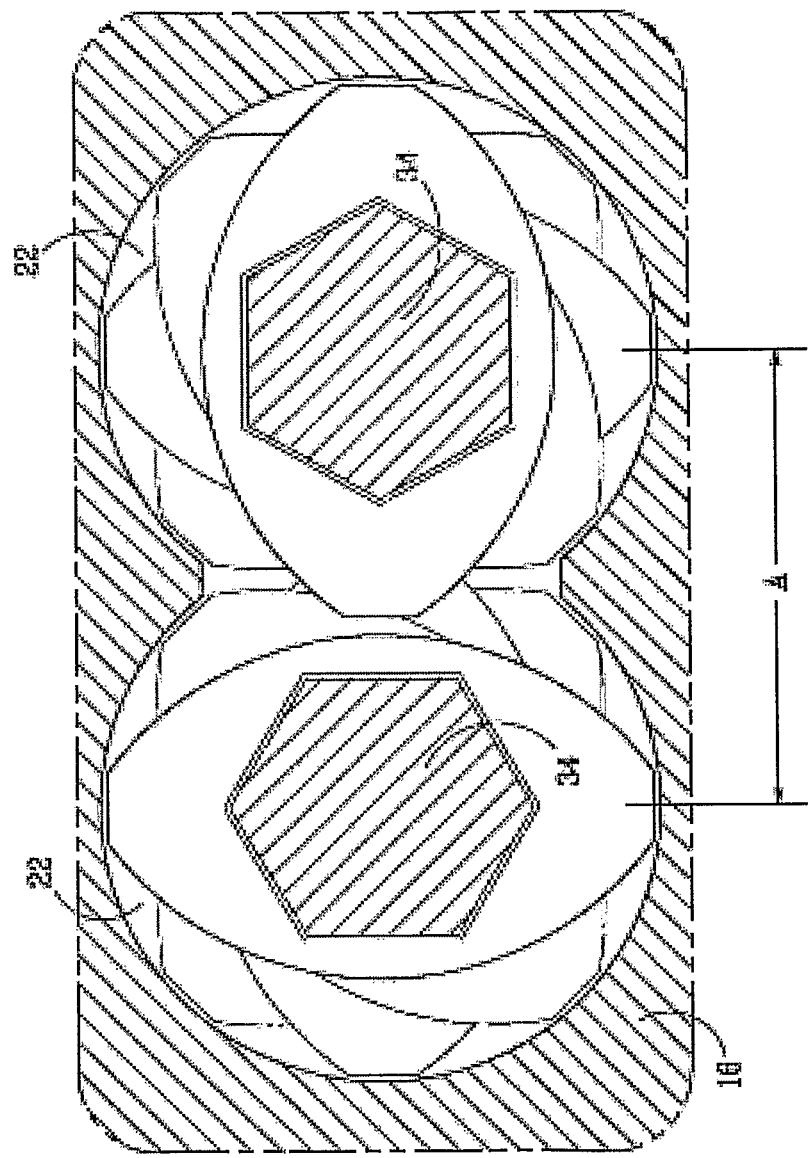
FIG. 2 is a cross-section through the extruder on the line 2-2 of FIG. 1 with the illustration of two kneading segments, in accordance herewith.

Referring now to FIG. 1, a twin screw extruder 10 is shown. Twin screw extruder 10 may be obtained from Japan Steel Works of Tokyo, Japan, and may be a Model TEX 54, TEX 65, or the like, for commercial use, or may be a TEX30, TEX44, or the like, for small-scale and laboratory use. Other polymer extruders may be employed, as those skilled in the art will readily understand. Twin screw extruder 10 includes a drive motor 12, a gear mechanism 14 joined thereto on the input side and a housing 16 having an inlet end 18 and an outlet end 20. As shown in FIG. 2 housing 16 includes a pair of interconnecting bores 22 disposed within housing 16. Referring again to FIG. 1, provided on housing 16 is an inlet hopper 24 for the supply of polymer (e.g., thermoplastic material) to be processed. The aforementioned components of the extruder 10 are supported by a plurality of props 26 positioned on a foundation 28 and joined thereto. Above the inlet hopper 24 may be positioned metering devices (not shown) for the metered addition of plastic pellets or other materials to the inlet hopper 24. At the end of the housing 16, which is downstream of the inlet end 18 and adjacent the outlet end 20 is a discharge opening 30 for the discharge of the material processed in the extruder 10. A diluent, e.g., a solvent for the thermopolastic material, may be introduced at a first injection tube 32 and, optionally, at a second injection tube 33.

Referring again to FIG. 2, interconnecting bores 22 of housing 16 are spaced apart from each other by a distance A and aligned parallel to each other. A pair of elongated extruder shafts 34, each having an axis of rotation, are disposed within the pair of interconnecting bores 22 and drivable in at least one direction of rotation by being joined to the power take-off side of gear mechanism 14, gear mechanism 14 driven by drive motor 12. In one form, to enable the keying of a plurality of screw segments to the pair of elongated extruder shafts 34, the pair of elongated extruder shafts 34 may be provided with a square, pentagonal, hexagonal or octagonal cross section or a cross section defined by a perimeter formed by a plurality of scallops.

As will be described in more detail below, a variety of screw segments are provided in a non-rotatable, fixed angular relationship on the elongated extruder shafts 34, such as intermeshing screws segments and kneading disks, which are selected in dependence on their function and disposed successively in the along the pair of elongated extruder shafts 34.

Referring now to FIG. 3, a plurality of extruder screw segments are shown, the plurality of extruder screw segments selected to form multiple extruder stages. In one form, the multiple extruder stages include an inlet stage 1100, a dispersion stage 1200, a mixing stage 1300, and an outlet stage 1400. These stages are also shown with respect to extruder 10 in FIG. 1. Each stage will now be described with reference to FIG. 3.

A plurality of extruder screw segments is provided to form inlet stage 1100. As shown in FIG. 1, inlet stage 1100 initiates near first end 18, terminates at dispersion stage 1200 and is positioned so as to receive thermoplastic material from inlet 24 for processing. As shown in FIG. 3, in one form, inlet stage 1100 includes a first forward full flight screw segment 1102, a second forward full flight screw segment 1104, and six third forward full flight screw segments 1106. In one form, first forward full flight screw segment 1102 has a length of 40.5 mm (When used in a 54 mm extruder, 0.75×extruder screw diameter "D"). Second forward full flight screw segment 1104 has a length of 1.00D. Third forward full flight screw segment 1106 has a length of 0.75D, for a total length of 5.25D. In one form, third forward full flight screw segment 106 has a shorter pitch than the pair of second forward full flight screw segments 104. In one form, inlet stage 1100 has a length Li of about 10%≤Li≤about 30% of the total length of extruder shaft.

Referring still to FIG. 3, a plurality of extruder screw segments is provided to form dispersion stage 1200. As shown generally in FIG. 1, dispersion stage 1200 follows inlet stage 1100, terminates at mixing stage 1300 and is positioned so as to receive a liquid diluent from first fluid inlet 32 for mixing with the thermoplastic material introduced at inlet stage 1100. As shown in FIG. 3, in one form, dispersion stage 1200 includes a first pre-kneading segment 1202, a second pre-kneading segment 1204, eleven first forward kneading segments 1206, and two second neutral kneading segments 1208. In one form, the ability of each pre-kneading segment to the move material forward is lower than that of third forward full flight screw segment 1106 and first kneading segment 1206. In one form, first pre-kneading segments 1202 has a length of 1.00D and second pre-kneading segment 1204 has a length of 0.75D. Forward kneading segment 1206 has a length of 0.50D, for a total length of 5.50D for the eleven forward kneading segments 1206. Neutral kneading segment 1208 has a length of 0.50D, for a total length of 1.00D for the two neutral kneading segments 1208. In one form, dispersion stage 1200 has a length Ld of about 10%≤Ld≤about 30% of the total length of extruder shaft.

Kneading segments are generally identified by offset angle/number of disks/disk length/segment length. As such, in one form, forward kneading segment 1206 is a 45/5/0.10D/0.50D forward kneading segment. As may be appreciated, these kneading disks are relatively narrow, allowing the polymer solution to flow around the flight tips, resulting in the stream splitting and recombining numerous times. With an offset angle of 40°≤θ≤50°, more forward conveying ability and less reverse conveying ability exists than for an offset angle θ of 60°.

It is interesting to note that, in the case of a dispersion stage disclosed herein, designed for preparing a polymer-diluent mixture, the discontinuous kneading segments described above provide dispersion utility, rather than distribution and stirring utility. This is contrary to their utility when employed in a system designed to prepare a melt-blended polymer, wherein a continuous flight kneading segment would be utilized for dispersion and a discontinuous kneading segment utilized for distribution and stirring. Importantly, the discontinuous kneading segments described above permit reverse polymer or polymer-diluent mixture flow, but do not permit the reverse flow of the solvent or diluent introduced within the dispersion stage.

Referring still to FIG. 3, a plurality of extruder screw segments is provided to form mixing stage 1300. Mixing stage 1300 follows dispersion stage 1200, terminates at outlet stage 1400 and is positioned so as to optionally receive a liquid diluent from second fluid inlet 33 for mixing with the polymer-diluent mixture (e.g., the polymer solution) formed within dispersion stage 1200. As shown in FIG. 3, in one form, mixing stage 1300 includes a full flight screw segment 1302, having a length of 0.75D, a pair of neutral kneading segments 1304, each having a length of 0.50D, and a reverse or back kneading segment 1306, having a length of 0.50D. Following the reverse or back kneading segment 1306 is a plurality of gear kneading segments 1308. In another form, mixing stage 1300 includes seven gear kneading segments 1308, each having a length of 1.50D, for a total length of 10.50D. In one form, each gear kneading segment 1308 includes a plurality of multi-tooth disks, each multi-tooth disks including 12 gear teeth. In another form, each gear kneading segment 1308 includes a five multi-tooth disks. Following the plurality of gear kneading segments 1308 is a plurality of reverse or back kneading segments 1310. In one form, eight reverse or back kneading segments 1310 are employed, each have a length of 0.5D, for a total length of 4.00D. In one form, mixing stage 1300 has a length Lm of about 25%≤Lm≤about 45% of the total length of the extruder shaft.

As shown in FIG. 3, a plurality of extruder screw segments is provided to form outlet stage 1400. As shown generally in FIG. 1, outlet stage 1400 follows mixing stage 1300, terminates at outlet end 30 and is positioned so as to permit venting from at least one vent 36. As shown in FIG. 3, in one form, outlet stage 1400 includes five first forward full flight screw segments 1402, a second forward full flight screw segments 1404 and a pair of third forward full flight screw segments 1406. In one form, each first forward full flight screw segment 1402 has a length of 1.5D, for a total length of 7.50D. Second forward full flight screw segment 1404 has a length of 1.00D. Each third forward full flight screw segments 1406 has a length of 0.75D, for a total length of 1.50D. In one form, outlet stage 1400 has a length Lo of about 0%≤Lo≤about 30% of the total length of extruder shaft.

In another form, a plurality of extruder screw segments is shown in FIG. 4. The plurality of extruder screw segments shown are selected to form multiple extruder stages. In one form, the multiple extruder stages include an inlet stage 2100, a dispersion stage 2200, a mixing stage 2300, and an outlet stage 2400. Each stage will now be described with reference to FIG. 4.

A plurality of extruder screw segments is provided to form inlet stage 2100. Referring generally also to FIG. 1, inlet stage 2100 initiates near first end 18, terminates at dispersion stage 2200 and is positioned so as to receive thermoplastic material from inlet 24 for processing. As shown in FIG. 4, in one form, inlet stage 2100 includes a first forward full flight screw segment 2102, and four second forward full flight screw segments 2104. In one form, first forward full flight screw segment 2102 has a length of 40.5 mm. (When used in a 54 mm extruder, 0.75×extruder screw diameter "D"). The second forward full flight screw segments 2104 each have a length of 0.75D, for a total length of 3.00D. In one form, inlet stage 2100 has a length of about 5%≤L≤about 30% of the total length of extruder shaft.

Referring still to FIG. 4, a plurality of extruder screw segments is provided to form dispersion stage 2200. Dispersion stage 2200 follows inlet stage 2100, terminates at mixing stage 2300 and is positioned so as to receive a liquid diluent from first fluid inlet 32 for mixing with the thermoplastic material introduced at inlet stage 2100. As shown in FIG. 4, in one form, dispersion stage 2200 includes a collar segment 2202, eleven first forward kneading segments 2204, a gear kneading segment 2206 and two second neutral kneading segments 2208. In one form, collar segment 2202 has a length of 0.75D. First forward kneading segment 2204 has a length of 0.50D, for a total length of 5.50D for the eleven first forward kneading segments 2204. Gear kneading segment 2206 has a length of 1.50D. Second neutral kneading segment 2206 has a length of 0.50D, for a total length of 1.00D for the two second neutral kneading segments 2206. In one form, dispersion stage 2200 has a length Ld of about 10%≤Ld≤about 35% of the total length of extruder shaft.

As indicated above, kneading segments are identified by offset angle/number of disks/disk length/segment length. As such, in one form, first forward kneading segment 2204 is a 45/5/0.10D/0.50D forward kneading segment. As may be appreciated, these kneading disks are relatively narrow, allowing the polymer-diluent mixture to flow around the flights, resulting in the stream splitting and recombining numerous times. With an offset angle of 40°≤θ≤50°, more forward conveying ability and less reverse conveying ability exists than for an offset angle θ of 60°.

Referring still to FIG. 4, a plurality of extruder screw segments is provided to form mixing stage 2300. Mixing stage 2300 follows dispersion stage 2200, terminates at outlet stage 2400 and is positioned so as to optionally receive the diluent from second fluid inlet for mixing with the polymer-diluent mixture formed within dispersion stage 2200. As shown in FIG. 4, in one form, mixing stage 2300 includes a full flight screw segment 2302, a forward kneading segment 2304, a plurality of gear kneading segments 2306, a plurality of neutral gear kneading segments 2308, a plurality of neutral kneading segments 2310 and a pair of reverse or back kneading segments 2312. Mixing stage 2300 includes six gear kneading segments 2306, each having a length of 1.50D, for a total length of 9.00D. In one form, each gear kneading segment 2306 includes a plurality of multi-tooth disks, each multi-tooth disks including 12 gear teeth. In another form, each gear kneading segment 2306 includes a five multi-tooth disks. In one form, seven neutral gear kneading segments 2308 are employed, each have a length of 1.5D, for a total length of 10.50D. Following the plurality of neutral gear kneading segments 2308 are three neutral kneading segments 2310, each having a length of 0.50D, for a total length of 1.50D. Following the neutral kneading segments 2310 is a pair of a pair of third forward full flight screw segments 1406 kneading segment 2312, each having a length of 0.50D, for a total length of 1.00D. In one form, mixing stage 2300 has a length Lm of about 40%≤Lm≤about 60% of the total length of the extruder shaft.

As shown in FIG. 4, a plurality of extruder screw segments is provided to form outlet stage 2400. As shown generally in FIG. 1, outlet stage 2400 follows mixing stage 2300, terminates at outlet end 32 and is positioned so as to permit venting from at least one vent 36. As shown in FIG. 4, in one form, outlet stage 2400 includes three first forward full flight screw segment 2402, a second forward full flight screw segment 2404 and a pair of third forward full flight screw segments 2406. In one form, each first forward full flight screw segment 2402 has a length of 1.5D, for a total length of 4.50D. Second forward full flight screw segment 2404 has a length of 1.00D. Each third forward full flight screw segments 2406 has a length of 0.75D, for a total length of 1.50D. In one form, outlet stage 2400 has a length Lo of about 10%≤Lo≤about 20% of the total length of extruder shaft.

Figure 5:
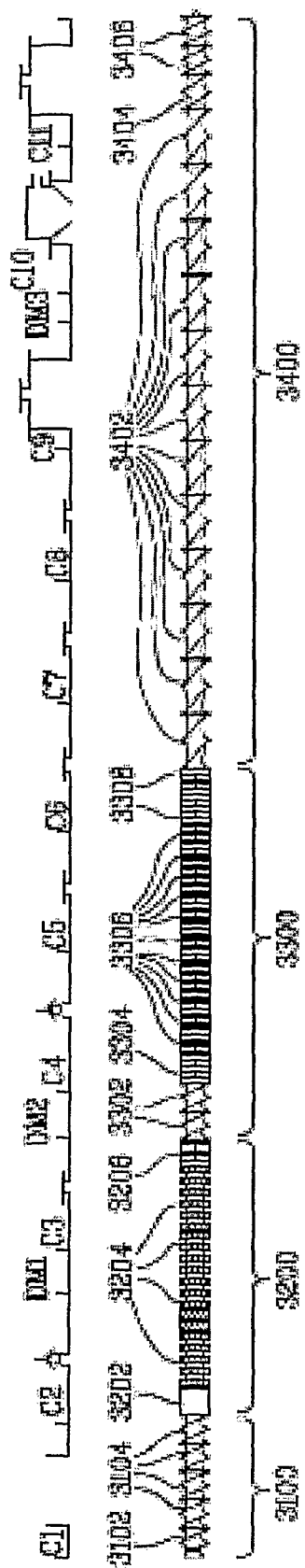
FIG. 5 is a schematic of still another screw segment configuration for preparing a polymer solution, in accordance herewith.

In yet another form, a plurality of extruder screw segments is shown in FIG. 5. The plurality of extruder screw segments shown are selected to form multiple extruder stages. In one form, the multiple extruder stages include an inlet stage 3100, a dispersion stage 3200, a mixing stage 3300, and an outlet stage 3400. Each stage will now be described with reference to FIG. 5.

A plurality of extruder screw segments is provided to form inlet stage 3100. Referring generally also to FIG. 1, inlet stage 3100 initiates near first end 18, terminates at dispersion stage 3200 and is positioned so as to receive thermoplastic material from inlet 24 for processing. As shown in FIG. 5, in one form, inlet stage 3100 includes a first forward full flight screw segment 3102, and four second forward full flight screw segments 3104. In one form, first forward full flight screw segment 3102 has a length of 40.5 mm. (When used in a 54 mm extruder, 0.75×extruder diameter "D"). The second forward full flight screw segments 3104 each have a length of 0.75D, for a total length of 3.00D. In one form, inlet stage 3100 has a length Li of about 5%≤Li≤about 30% of the total length of extruder shaft.

Referring still to FIG. 5, a plurality of extruder screw segments is provided to form dispersion stage 3200. Dispersion stage 3200 follows inlet stage 3100, terminates at mixing stage 3300 and is positioned so as to receive a diluent from first fluid inlet 32 for mixing with the thermoplastic material introduced at inlet stage 3100. As shown in FIG. 5, in one form, dispersion stage 3200 includes a collar segment 3202, four gear kneading segments 3204, and one neutral kneading segment 3206. In one form, collar segment 3202 has a length of 0.75D, and each gear kneading segment 3202 has a length of 1.50D, for a total length of 6.00D. Neutral kneading segment 3206 has a length of 1.00D. In one form, dispersion stage 3200 has a length Ld of about 10%≤Ld≤about 35% of the total length of extruder shaft 34.

Referring still to FIG. 5, a plurality of extruder screw segments is provided to form mixing stage 3300. Mixing stage 3300 follows dispersion stage 3200, terminates at outlet stage 3400 and is positioned so as to optionally receive a diluent from second fluid inlet for mixing with the polymer-diluent mixture (e.g., polymer solution) formed within dispersion stage 3200. As shown in FIG. 5, in one form, mixing stage 3300 includes two full flight screw segments 3302, each having a length of 0.75D, for a total length of 1.50D, a long neutral kneading segment 3304, having a length of 1.00D, a plurality of shorter neutral kneading segments 3306 and a pair of long neutral kneading segments 3308, each having a length of 1.00D. In one form, the plurality of shorter neutral kneading segments 3306 includes eleven neutral kneading segments 3306, each having a length of 0.50D, for a total length of 5.50D. In one form, mixing stage 3300 has a length Lm of about 15%≤Lm≤about 35% of the total length of extruder shaft.

As shown in FIG. 5, a plurality of extruder screw segments is provided to form outlet stage 3400. As shown generally in FIG. 1, outlet stage 3400 follows mixing stage 3300, terminates at outlet end 32 and is positioned so as to permit venting from at least one vent 36. In one form, outlet stage 3400 includes twelve long forward full flight screw segments 3402, one mid-length forward full flight screw segment 3404, and two short forward full flight screw segments 3406. In one form, each long forward full flight screw segment 3402 has a length of 1.5D, for a total length of 18.00D. Mid-length forward full flight screw segment 3404 has a length of 1.00D. Each short forward full flight screw segment 3406 has a length of 0.75D, for a total length of 1.50D. In one form, outlet stage 3400 has a length Lo of about 0%≤Lo≤about 55% of the total length of extruder shaft.

Figure 6:
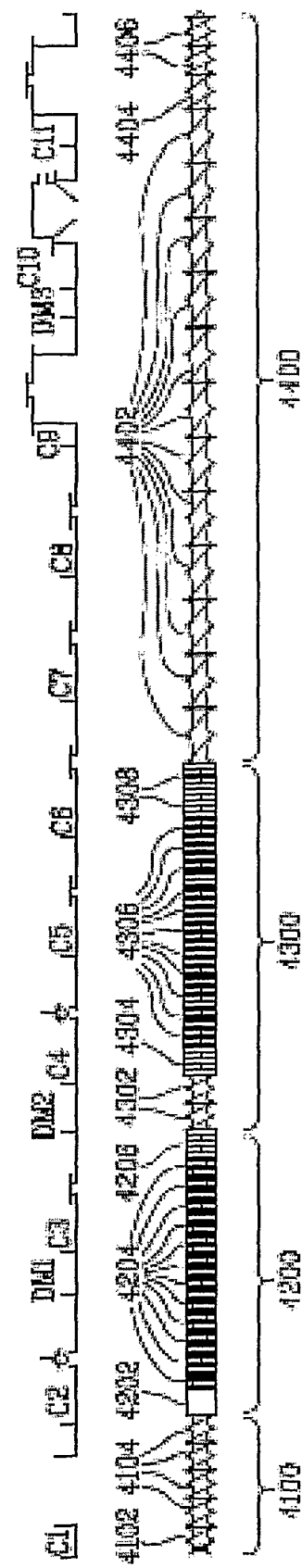
FIG. 6 is a schematic of yet still another screw segment configuration for preparing a polymer solution, in accordance herewith.

In a further form, a plurality of extruder screw segments is shown in FIG. 6. The plurality of extruder screw segments shown is selected to form multiple extruder stages. In one form, the multiple extruder stages include an inlet stage 4100, a dispersion stage 4200, a mixing stage 4300, and an outlet stage 4500. Each stage will now be described with reference to FIG. 6.

A plurality of extruder screw segments is provided to form inlet stage 4100. Referring generally also to FIG. 1, inlet stage 4100 initiates near first end 18, terminates at dispersion stage 4200 and is positioned so as to receive thermoplastic material from inlet 24 for processing. As shown in FIG. 6, in one form, inlet stage 4100 includes a first forward full flight screw segment 4102, and four second forward full flight screw segments 4104. In one form, first forward full flight screw segment 4102 has a length of 40.5 mm. (When used in a 54 mm extruder, 0.75×extruder diameter "D"). The second forward full flight screw segments 4104 each have a length of 0.75D, for a total length of 3.00D. In one form, inlet stage 4100 has a length Li of about 5%≤Li≤about 30% of the total length of extruder shaft.

Referring still to FIG. 6, a plurality of extruder screw segments is provided to form dispersion stage 4200. Dispersion stage 4200 follows inlet stage 4100, terminates at mixing stage 4300 and is positioned so as to receive a diluent from first fluid inlet 32 for mixing with the thermoplastic material introduced at inlet stage 4100. As shown in FIG. 6, in one form, dispersion stage 4200 includes a collar segment 4202, twelve forward kneading segments 4204, and a neutral kneading segment 4206. In one form, collar segment 4202 has a length of 0.75D. Forward kneading segment 4204 has a length of 0.50D, for a total length of 6.00D for the twelve forward kneading segments 4204. Neutral kneading segment 4206 has a length of 1.00D. In one form, dispersion stage 4200 has a length Ld of about 10%≤Ld≤about 35 of the total length of extruder shaft.

As indicated above, kneading segments are identified by offset angle/number of disks/disk length/segment length. As such, in one form, forward kneading segment 4204 is a 45/5/0.10D/0.50D forward kneading segment. As may be appreciated, these kneading disks are relatively narrow, allowing the polymer solution to flow around the flights, resulting in the stream splitting and recombining numerous times. With an offset angle of 40°≤θ≤50°, more forward conveying ability and less reverse conveying ability exists than for an offset angle θ of 60°.

Referring still to FIG. 6, a plurality of extruder screw segments is provided to form mixing stage 4300. Mixing stage 4300 follows dispersion stage 4200, terminates at outlet stage 4400 and is positioned so as to optionally receive a diluent from second fluid inlet for mixing with the polymer solution formed within dispersion stage 4200. As shown in FIG. 6, in one form, mixing stage 4300 includes two full flight screw segments 4302, a long neutral kneading segment 4304, having a length of 1.00D, a plurality of shorter neutral kneading segments 4306 and a pair of long neutral kneading segments 4308, each having a length of 1.00D. In one form, the plurality of shorter neutral kneading segments 4306 includes eleven neutral kneading segments 4306, each having a length of 0.50D, for a total length of 5.50D. In one form, mixing stage 4300 has a length Lm of about 15%≤Lm≤about 35% of the total length of extruder shaft.

As shown in FIG. 6, a plurality of extruder screw segments is provided to form outlet stage 4400. As shown generally in FIG. 1, outlet stage 4400 follows mixing stage 4300, terminates at outlet end 32 and is positioned so as to permit venting from at least one vent 36. In one form, outlet stage 4400 includes twelve long forward full flight screw segments 4402, one mid-length forward full flight screw segment 4404, and two short forward full flight screw segments 4406. In one form, each long forward full flight screw segment 4402 has a length of 1.5D, for a total length of 18.00D. Mid-length forward full flight screw segment 4404 has a length of 1.00D. Each short forward full flight screw segment 4406 has a length of 0.75D, for a total length of 1.50D. In one form, outlet stage 4400 has a length Lo of about 0%≤Lo≤about 55% of the total length of extruder shaft.

In a further form, a plurality of extruder screw segments is shown in FIG. 7. The plurality of extruder screw segments shown is selected to form multiple extruder stages. In one form, the multiple extruder stages include an inlet stage 5100, a dispersion stage 5200, a mixing stage 5300, and an outlet stage 5500. Each stage will now be described with reference to FIG. 7.

A plurality of extruder screw segments is provided to form inlet stage 5100. Referring generally also to FIG. 1, inlet stage 5100 initiates near first end 18, terminates at dispersion stage 5200 and is positioned so as to receive thermoplastic material from inlet 24 for processing. As shown in FIG. 7, in one form, inlet stage 5100 includes a first forward full flight screw segment 5102, and four second forward full flight screw segments 5104. In one form, first forward full flight screw segment 5102 has a length of 40.5 mm. (When used in a 54 mm extruder, 0.75×extruder diameter "D"). The second forward full flight screw segments 5104 each have a length of 0.75D, for a total length of 3.00D. In one form, inlet stage 5100 has a length Li of about 5%≤Li≤about 30% of the total length of extruder shaft.

Referring still to FIG. 7, a plurality of extruder screw segments is provided to form dispersion stage 5200. Dispersion stage 5200 follows inlet stage 5100, terminates at mixing stage 5300 and is positioned so as to receive a diluent from first fluid inlet 32 for mixing with the thermoplastic material introduced at inlet stage 5100. As shown in FIG. 7, in one form, dispersion stage 5200 includes a collar segment 5202, twelve forward kneading segments 5204, and a neutral kneading segment 5206. In one form, collar segment 5202 has a length of 0.75D. Forward kneading segment 5204 has a length of 0.50D, for a total length of 6.00D for the twelve forward kneading segments 5204. Neutral kneading segment 5206 has a length of 1.00D. In one form, dispersion stage 5200 has a length Ld of about 10%≤Ld≤about 35% of the total length of extruder shaft.

As indicated above, kneading segments are identified by offset angle/number of disks/disk length/segment length. As such, in one form, forward kneading segment 5204 is a 45/5/0.10D/0.50D forward kneading segment. As may be appreciated, these kneading disks are relatively narrow, allowing the polymer solution to flow around the flights, resulting in the stream splitting and recombining numerous times. With an offset angle of 40°≤θ≤50°, more forward conveying ability and less reverse conveying ability exists than for an offset angle θ of 60°.

Referring still to FIG. 7, a plurality of extruder screw segments is provided to form mixing stage 5300. Mixing stage 5300 follows dispersion stage 5200, terminates at outlet stage 5400 and is positioned so as to optionally receive a diluent from second fluid inlet for mixing with the polymer solution formed within dispersion stage 5200. As shown in FIG. 7, in one form, mixing stage 5300 includes two full flight screw segments 5302, a long neutral kneading segment 5304, having a length of 1.00D, a plurality of forward gear kneading segments 5306 and a plurality of reverse kneading segments 5308, each having a length of 0.50D, for a total length of 1.50D. In one form, the plurality of forward gear kneading segments 5306 includes four forward gear kneading segments 5306, each having a length of 1.50D, for a total length of 6.00D. In one form, mixing stage 5300 has a length Lm of about 15%≤Lm≤about 35% of the total length of extruder shaft.

As shown in FIG. 7, a plurality of extruder screw segments is provided to form outlet stage 5400. As shown generally in FIG. 1, outlet stage 5400 follows mixing stage 5300, terminates at outlet end 32 and is positioned so as to permit venting from at least one vent 36. In one form, outlet stage 5400 includes twelve long forward full flight screw segments 5402, one mid-length forward full flight screw segment 5404, and two short forward full flight screw segments 5406. In one form, each long forward full flight screw segment 5402 has a length of 1.5D, for a total length of 18.00D. Mid-length forward full flight screw segment 5404 has a length of 1.00D. Each short forward full flight screw segment 5406 has a length of 0.75D, for a total length of 1.50D. In one form, outlet stage 5400 has a length Lo of about 0%≤Lo≤about 55% of the total length of extruder shaft.

In a further form, a plurality of extruder screw segments is shown in FIG. 8. The plurality of extruder screw segments shown is selected to form multiple extruder stages. In one form, the multiple extruder stages include an inlet stage 6100, a dispersion stage 6200, a mixing stage 6300, and an outlet stage 6500. Each stage will now be described with reference to FIG. 8.

A plurality of extruder screw segments is provided to form inlet stage 6100. Referring generally also to FIG. 1, inlet stage 6100 initiates near first end 18, terminates at dispersion stage

6200 and is positioned so as to receive thermoplastic material from inlet 24 for processing. As shown in FIG. 8, in one form, inlet stage 6100 includes a first forward full flight screw segment 6102, and four second forward full flight screw segments 6104. In one form, first forward full flight screw segment 6102 has a length of 40.5 mm. (When used in a 54 mm extruder, 0.75×extruder diameter "D"). The second forward full flight screw segments 6104 each have a length of 0.75D, for a total length of 3.00D. In one form, inlet stage 6100 has a length Li of about 5%≤Li≤about 30% of the total length of extruder shaft.

Referring still to FIG. 8, a plurality of extruder screw segments is provided to form dispersion stage 6200. Dispersion stage 6200 follows inlet stage 6100, terminates at mixing stage 6300 and is positioned so as to receive a liquid solvent from first fluid inlet 32 for mixing with the thermoplastic material introduced at inlet stage 6100. As shown in FIG. 7, in one form, dispersion stage 6200 includes a collar segment 6202, twelve forward kneading segments 6204, and a neutral kneading segment 6206. In one form, collar segment 6202 has a length of 0.75D. Forward kneading segment 6204 has a length of 0.50D, for a total length of 6.00D for the twelve forward kneading segments 6204. Neutral kneading segment 6206 has a length of 1.00D. In one form, dispersion stage 6200 has a length Ld of about 10%≤Ld≤about 35% of the total length of extruder shaft.

As indicated above, kneading segments are identified by offset angle/number of disks/disk length/segment length. As such, in one form, forward kneading segment 6204 is a 45/5/0.10D/0.50D forward kneading segment. As may be appreciated, these kneading disks are relatively narrow, allowing the polymer-diluent mixture to flow around the flights, resulting in the stream splitting and recombining numerous times. With an offset angle of 40°≤θ≤50°, more forward conveying ability and less reverse conveying ability exists than for an offset angle θ of 60°.

Referring still to FIG. 8, a plurality of extruder screw segments is provided to form mixing stage 6300. Mixing stage 6300 follows dispersion stage 6200, terminates at outlet stage 6400 and is positioned so as to optionally receive a liquid solvent from second fluid inlet for mixing with the polymer solution formed within dispersion stage 6200. As shown in FIG. 8, in one form, mixing stage 6300 includes two full flight screw segments 6302, a long neutral kneading segment 6304, having a length of 1.00D, and a plurality of neutral gear kneading segments 6306. In one form, the plurality of neutral gear kneading segments 6306 includes five neutral gear kneading segments 6306, each having a length of 1.50D, for a total length of 7.50D. In one form, mixing stage 6300 has a length Lm of about 15%≤Lm≤about 35% of the total length of extruder shaft.

As shown in FIG. 8, a plurality of extruder screw segments is provided to form outlet stage 6400. As shown generally in FIG. 1, outlet stage 6400 follows mixing stage 6300, terminates at outlet end 32 and is positioned so as to permit venting from at least one vent 36. In one form, outlet stage 6400 includes twelve long forward full flight screw segments 6402, one mid-length forward full flight screw segment 6404, and two short forward full flight screw segments 6406. In one form, each long forward full flight screw segment 6402 has a length of 1.5D, for a total length of 18.00D. Mid-length forward full flight screw segment 6404 has a length of 1.00D. Each short forward full flight screw segment 6406 has a length of 0.75D, for a total length of 1.50D. In one form, outlet stage 6400 has a length Lo of about 0%≤Lo≤about 55% of the total length of extruder shaft 34.

In another form, provided is a process for extruding a polymer-diluent mixture. The process includes the steps of blending at least one polymer at a rate of P grams per second in an inlet stage 1100 and conducting the blended polymer to a dispersion stage 1200. At least one diluent, e.g., a solvent, is introduced to the blended polymer in the dispersion stage 1200 at a rate of S grams per second, the diluent having a lower viscosity than the polymer. The diluent is then dispersed in the polymer and conducted to a mixing stage 1300. In the mixing stage 1300, diluent and the polymer is blended in order to produce a third-stage product, the third stage product comprising (i) the polymer-diluent mixture in a first phase, (ii) a portion of the diluent in a second phase separate from the first phase, and (iii) a portion of the polymer in a third phase separate from the first and second phases. In one form, the mixing energy in the mixing stage 1300 is greater than the mixing energy in either the inlet stage 1100 or dispersion stage 1200.

In one form, the first phase is produced at a rate of R grams per second, with R being about 0.9×(P+S) or greater, the second phase is produced at a rate that does not exceed 0.05×S, and the third phase is produced at a rate that does not exceed 0.05×P. In another form, rate of countercurrent diluent flow from the dispersion stage to the inlet stage 100 does not exceed 0.1×S.

In another form, a major portion of the polymer is a first polyethylene, having a molecular weight in the range of from $1.0 \times 10^4$ to $9 \times 10^5$ and a second polyethylene, having a molecular weight in the range of from $9.0 \times 10^5$ to $5.0 \times 10^6$. In yet another form, the polymer further comprises polypropylene having a molecular weight in the range of from $3.0 \times 10^5$ to $3.0 \times 10^6$. In one form, the first polyethylene is present in the polymer in an amount in the range of from 0 to 100%, the second polyethylene is present in the polymer in an amount in the range of from 0 to 100%, and the polypropylene is in the polymer in an amount in the range of from 0 to 70%. In another form, the diluent (solvent) is liquid paraffin, P is from 3 to 15, and S=is from 5 to 50.

In one form the mixing energy in the inlet stage 1100 and/or the dispersion stage 1200 is lower than the mixing stage 1300. The process conditions in the inlet stage 1100 is characterized by a temperature set to 150° C., P=10, a pressure less than 5 kg/cm$^2$, and a residence time of 18 seconds, and the dispersion stage 200 is characterized by a temperature of 200° C., S=23, a pressure of less than 5 kg/cm$^2$, and a residence time of 10 seconds. In another form, the mixing energy is obtained from at least one segmented mixing screw extending continuously in the direction of polymer flow through the inlet stage 1100 and the dispersion stage 1200.

The extruder forms disclosed herein find utility in the extrusion and production of microporous films and sheets. These films and sheets find particular utility in the critical field of battery separators. The multi-layer films and sheets described hereinbelow can either be produced using a coextrusion die or be produced using a monolayer die to produce a monolayer film or sheet, with additional layers laminated thereto in a conventional manner.

In one form, the multi-layer, microporous membrane comprises two layers. The first layer (e.g., the skin, top or upper layer of the membrane) comprises a first microporous layer material, and the second layer (e.g., the bottom or lower or core layer of the membrane) comprises a second microporous layer material. For example, the membrane can have a planar top layer when viewed from above on an axis approximately perpendicular to the transverse and longitudinal (machine) directions of the membrane, with the bottom planar layer hidden from view by the top layer.

In another form, the multi-layer, microporous membrane comprises three or more layers, wherein the outer layers (also called the "surface" or "skin" layers) comprise the first microporous layer material and at least one core or intermediate layer comprises the second microporous layer material. In a related form, where the multi-layer, microporous polyolefin membrane comprises two layers, the first layer consists essentially of the first microporous layer material and the second layer consists essentially of the second microporous layer material. In a related form where the multi-layer, microporous membrane comprises three or more layers, the outer layers consist essentially of the first microporous layer material and at least one intermediate layer consists essentially of (or consists of) the second microporous layer material.

Starting materials having utility in the production of the afore-mentioned films and sheets will now be described. As will be appreciated by those skilled in the art, the selection of a starting material is not critical. In one form, the first and second microporous layer materials contain polyethylene. In one form, the first microporous layer material contains a first polyethylene ("PE-1") having an Mw value of less than about $1\times10^6$ or a second polyethylene ("UHMWPE-1") having an Mw value of at least about $1\times10^6$. In one form, the first microporous layer material can contain a first polypropylene ("PP-1"). In one form, the first microporous layer material comprises one of (i) a polyethylene (PE), (ii) an ultra high molecular weight polyethylene (UHMWPE), (iii) PE-1 and PP-1, or (iv) PE-1, UHMWPE-1, and PP-1.

In one form of the above (ii) and (iv), UHMWPE-1 can preferably have an Mw in the range of from about $1\times10^6$ to about $15\times10^6$ or from about $1\times10^6$ to about $5\times10^6$ or from about $1\times10^6$ to about $3\times10^6$, and preferably contain greater than about 1 wt. %, or about 15 wt. % to 40 wt. %, on the basis of total amount of PE-1 and UHMWPE-1 in order to obtain a microporous layer having a hybrid structure defined in the later section, and can be at least one of homopolymer or copolymer. In one form of the above (iii) and (iv), PP-1 can be at least one of a homopolymer or copolymer, or can preferably contain no more than about 25 wt. %, on the basis of total amount of the first layer microporous material. In one form, the Mw of polyolefin in the first microporous layer material can have about $1\times10^6$ or less, or in the range of from about $1\times10^5$ to about $1\times10^6$ or from about $2\times10^5$ to about $1\times10^6$ in order to obtain a microporous layer having a hybrid structure defined in the later section. In one form, PE-1 can preferably have an Mw ranging from about $1\times10^4$ to about $5\times10^5$, or from about $2\times10^5$ to about $4\times10^5$, and can be one or more of a high-density polyethylene, a medium-density polyethylene, a branched low-density polyethylene, or a linear low-density polyethylene, and can be at least one of a homopolymer or copolymer.

In one form, the first microporous layer material (the first layer of the two-layer, microporous membrane and the first and third layers of a three-layer microporous membrane) has a hybrid structure, which is characterized by a pore size distribution exhibiting relatively dense domains having a main peak in a range of 0.01 μm to 0.08 μm and relatively coarse domains exhibiting at least one sub-peak in a range of more than 0.08 μm to 1.5 μm or less in the pore size distribution curve. The ratio of the pore volume of the dense domains (calculated from the main peak) to the pore volume of the coarse domains (calculated from the sub-peak) is not critical, and can range, e.g., from about 0.5 to about 49.

In one form, the second microporous layer material comprises one of: (i) a fourth polyethylene having an Mw of at least about $1\times10^6$, (UHMWPE-2), (ii) a third polyethylene having an Mw that is less than $1\times10^6$ and UHMWPE-2 and the fourth polyethylene, wherein the fourth polyethylene is present in an amount of at least about 8% by mass based on the combined mass of the third and fourth polyethylene; (iii) UHMWPE-2 and PP-2, or (iv) PE-2, UHMWPE-2, and PP-2. In one form of the above (ii), (iii) and (iv), UHMWPE-2 can contain at least about 8 wt. %, or at least about 20 wt. %, or at least about 25 wt. %, based on the total amount of UHMWPE-2, PE-2 and PP-2 in order to produce a relatively strong multi-layer, microporous membrane. In one form of the above (iii) and (iv), PP-2 can be at least one of a homopolymer or copolymer, and can contain 50 wt. % or less, 35 wt. % or less, 25 wt. % or less, or in the range of from about 2% to about 50%, of from about 2% to about 15%, or from about 3% to about 10%, based on the total amount of the second microporous layer material. In one form, preferable PE-2 can be the same as PE-1, but can be selected independently. In one form, preferable UHMWPE-2 can be the same as UHMWPE-1, but can be selected independently.

In addition to the first, second, third, and fourth polyethylenes and the first and second polypropylenes, each of the first and second layer materials can optionally contain one or more additional polyolefins, identified as the seventh polyolefin, which can be, e.g., one or more of polybutene-1, polypentene-1, poly-4-methylpentene-1, polyhexene-1, polyoctene-1, polyvinyl acetate, polymethyl methacrylate, polystyrene and an ethylene α-olefin copolymer (except for an ethylene-propylene copolymer) and can have an Mw in the range of about $1\times10^4$ to about $4\times10^6$. In addition to or besides the seventh polyolefin, the first and second microporous layer materials can further comprise a polyethylene wax, e.g., one having an Mw in the range of about $1\times10^3$ to about $1\times10^4$.

In one form, a process for producing a two-layer microporous membrane is provided. In another form, the microporous membrane has at least three layers. For the sake of brevity, the production of the microporous membrane will be mainly described in terms of two-layer and three-layer membrane.

In one form, a three-layer microporous membrane comprises first and third microporous layers constituting the outer layers of the microporous membrane and a second (core) layer situated between (and optionally in planar contact with) the first and third layers. In another form, the first and third layers are produced from a first mixture, e.g., a first polyolefin solution and the second (core) layer is produced from a second mixture, e.g., a second polyolefin solution.

In one form, a method for producing the multi-layer, microporous membrane is provided. The method comprises the steps of (1) combining (e.g., by blending) a first polyolefin composition and a membrane-forming solvent to prepare a first polyolefin solution in an extruder of the type disclosed herein, (2) combining a second polyolefin composition and a second membrane-forming solvent to prepare a second polyolefin solution in an extruder of the type disclosed herein, (3) extruding the first polyolefin solution through a first die and the second solution through a second die and then laminating the extruded first and second polyolefin solutions to form a multi-layer extrudate, (4) cooling the multi-layer extrudate to form a multi-layer, gel-like sheet (cooled extrudate), (5) removing the membrane-forming solvent from the multi-layer, gel-like sheet to form a solvent-removed gel-like sheet, and (6) drying the solvent-removed gel-like sheet in order to form the multi-layer, microporous membrane. An optional stretching step (7) and an optional hot solvent treatment step (8) can be conducted between steps (4) and (5), if desired. After step (6), an optional step (9) of stretching a multi-layer, microporous membrane, an optional heat treatment step (10), an optional cross-linking step with ionizing radiations (11), and an optional hydrophilic treatment step (12), etc., can be conducted.

The first polyolefin composition comprises polyolefin resins as described above that can be combined, e.g., by dry mixing or blending with an appropriate membrane-forming solvent to produce the first polyolefin solution. Optionally, the first polyolefin solution can contain various additives such as one or more antioxidant, fine silicate powder (pore-forming material), etc., provided these are used in a concentration range that does not significantly degrade the desired properties of the multi-layer, microporous membrane.

The first membrane-forming solvent is preferably a solvent that is liquid at room temperature. While not wishing to be bound by any theory or model, it is believed that the use of a liquid solvent to form the first polyolefin solution makes it possible to conduct stretching of the gel-like sheet at a relatively high stretching magnification. In one form, the first membrane-forming solvent can be at least one of aliphatic, alicyclic or aromatic hydrocarbons such as nonane, decane, decalin, p-xylene, undecane, dodecane, liquid paraffin, etc.; mineral oil distillates having boiling points comparable to those of the above hydrocarbons; and phthalates liquid at room temperature such as dibutyl phthalate, dioctyl phthalate, etc. In one form where it is desired to obtain a multi-layer, gel-like sheet having a stable liquid solvent content, non-volatile liquid solvents such as liquid paraffin can be used, either alone or in combination with other solvents. Optionally, a solvent which is miscible with polyethylene in a blended state but solid at room temperature can be used, either alone or in combination with a liquid solvent. Such solid solvent can include, e.g., stearyl alcohol, ceryl alcohol, paraffin waxes, etc.

The viscosity of the liquid solvent is not a critical parameter. For example, the viscosity of the liquid solvent can range from about 30 cSt to about 500 cSt, or from about 30 cSt to about 200 cSt, at 25° C. Although it is not a critical parameter, when the viscosity at 25° C. is less than about 30 cSt, it can be more difficult to prevent foaming the polyolefin solution, which can lead to difficulty in blending. On the other hand, when the viscosity is greater than about 500 cSt, it can be more difficult to remove the liquid solvent from the multi-layer microporous membrane.

In one form, the resins, etc., used to produce to the first polyolefin composition are blended in, e.g., a double-screw extruder or mixer. For example, a conventional extruder (or mixer or mixer-extruder) such as a double-screw extruder can be used to combine the resins, etc., to form the first polyolefin composition. The membrane-forming solvent can be added to the polyolefin composition (or alternatively to the resins used to produce the polyolefin composition) at any convenient point in the process. For example, in one form where the first polyolefin composition and the first membrane-forming solvent are blended, the solvent can be added to the polyolefin composition (or its components) at any of (i) before the start of blending, (ii) during blending of the first polyolefin composition, or (iii) after blending, e.g., by supplying the first membrane-forming solvent to the blended or partially blended polyolefin composition in a second extruder or extruder zone located downstream of the extruder zone used to blend the polyolefin composition.

When an extruder of the type disclosed herein is employed, the screw can be characterized by a ratio L/D of the screw length L to the screw diameter D in the double-screw extruder, which can range, for example, from about 20 to about 200 or from about 35 to about 100. Although this parameter is not critical, when L/D is less than about 20, blending can be more difficult, and when L/D is more than about 100, faster extruder speeds might be needed to prevent excessive residence time of the polyolefin solution in the double-screw extruder, which can lead to undesirable molecular weight degradation. Although it is not a critical parameter, the cylinder (or bore) of the double-screw extruder can have an inner diameter of in the range of about 30 mm to about 100 mm, for example.

The amount of the first polyolefin composition in the first polyolefin solution is not critical. In one form, the amount of first polyolefin composition in the first polyolefin solution can range from about 1 wt. % to about 75 wt. %, based on the weight of the polyolefin solution, for example from about 20 wt. % to about 70 wt. %.

The second polyolefin solution can be prepared by the same methods used to prepare the first polyolefin solution. For example, the second polyolefin solution can be prepared by blending a second polyolefin composition with a second membrane-forming solvent.

The amount of the second polyolefin composition in the second polyolefin solution is not critical. In one form, the amount of second polyolefin composition in the second polyolefin solution can range from about 1 wt. % to about 75 wt. %, based on the weight of the second polyolefin solution, for example from about 20 wt. % to about 70 wt. %.

A monolayer extrusion die may be used to form an extrudate that can be laminated. In one form, extrusion dies, which can be adjacent or connected, are used to form the extrudates. The first and second sheet dies are connected to first and second extruders, respectively, where the first extruder contains the first polyolefin solution and the second extruder contains the second polyolefin solution. While not critical, lamination is generally easier to accomplish when the extruded first and second polyolefin solution are still at approximately the extrusion temperature.

In another form, first, second, and third dies are connected to first, second and third extruders of the type disclosed herein, where the first and third dies contain the first polyolefin solutions, and the second die contains the second polyolefin solution. In this form, a laminated extrudate is formed constituting outer layers comprising the extruded first polyolefin solution and one intermediate comprising the extruded second polyolefin solution.

In yet another form, the first, second, and third dies are connected to first, second, and third extruders of the type disclosed herein, where the second die contains the first polyolefin solution, and the first and third dies contain the second polyolefin solution. In this form, a laminated extrudate is formed constituting outer layers comprising the extruded second polyolefin solution and one intermediate comprising extruded first polyolefin solution.

The die gaps are generally not critical. For example, extrusion dies can have a die gap of about 0.1 mm to about 5 mm. Die temperature and extruding speed are also non-critical parameters. For example, the dies can be heated to a die temperature ranging from about 140° C. to about 250° C. during extrusion. The extruding speed can range, for example, from about 0.2 m/minute to about 15 m/minute. The thickness of the layers of the layered extrudate can be independently selected. For example, the resultant sheet can have relatively thick skin or surface layers compared to the thickness of an intermediate layer of the layered extrudate.

A cooled extrudate, e.g., a multi-layer, gel-like sheet can be obtained by cooling, for example. Cooling rate and cooling temperature are not particularly critical. For example, the multi-layer, gel-like sheet can be cooled at a cooling rate of at least about 50° C./minute until the temperature of the multilayer, gel-like sheet (the cooling temperature) is approximately equal to the multi-layer, gel-like sheet's gelatin temperature (or lower). In one form, the extrudate is cooled to a temperature of about 25° C. or lower in order to form the multi-layer gel-like sheet.

In one form, the first and second membrane-forming solvents are removed (or displaced) from the multi-layer gel-like sheet in order to form a solvent-removed gel-like sheet. A displacing (or "washing") solvent can be used to remove (wash away, or displace) the first and second membrane-forming solvents. The choice of washing solvent is not critical provided it is capable of dissolving or displacing at least a portion of the first and/or second membrane-forming solvent. Suitable washing solvents include, for instance, one or more of volatile solvents such as saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2H_5$, etc.

The method for removing the membrane-forming solvent is not critical, and any method capable of removing a significant amount of solvent can be used, including conventional solvent-removal methods. For example, the multi-layer, gel-like sheet can be washed by immersing the sheet in the washing solvent and/or showering the sheet with the washing solvent. The amount of washing solvent used is not critical, and will generally depend on the method selected for removal of the membrane-forming solvent. In one form, the membrane-forming solvent is removed from the gel-like sheet (e.g., by washing) until the amount of the remaining membrane-forming solvent in the multi-layer gel-like sheet becomes less than 1 wt. %, based on the weight of the gel-like sheet.

In one form, the solvent-removed multi-layer, gel-like sheet obtained by removing the membrane-forming solvent is dried in order to remove the washing solvent. Any method capable of removing the washing solvent can be used, including conventional methods such as heat-drying, wind-drying (moving air), etc. The temperature of the gel-like sheet during drying (i.e., drying temperature) is not critical. For example, the drying temperature can be equal to or lower than the crystal dispersion temperature Tcd. Tcd is the lower of the crystal dispersion temperature $Tcd_1$ of the polyethylene in the first resin and the crystal dispersion temperature $Tcd_2$ of the polyethylene in the second resin. For example, the drying temperature can be at least 5° C. below the crystal dispersion temperature Tcd. The crystal dispersion temperature of the polyethylene in the first and second resins can be determined by measuring the temperature characteristics of the kinetic viscoelasticity of the polyethylene according to ASTM D 4065. In one form, the polyethylene in at least one of the first or second resins has a crystal dispersion temperature in the range of about 90° C. to about 100° C.

Although it is not critical, drying can be conducted until the amount of remaining washing solvent is about 5 wt. % or less on a dry basis, i.e., based on the weight of the dry multi-layer, microporous membrane. In another form, drying is conducted until the amount of remaining washing solvent is about 3 wt. % or less on a dry basis.

Prior to the step for removing the membrane-forming solvents, the multi-layer, gel-like sheet can be stretched in order to obtain a stretched, multi-layer, gel-like sheet.

Neither the choice of stretching method nor the degree of stretching magnification is particularly critical. In one form, the stretching can be accomplished by one or more of tenter-stretching, roller-stretching, or inflation stretching (e.g., with air). Although the choice is not critical, the stretching can be conducted monoaxially (i.e., in either the machine or transverse direction) or biaxially (both the machine and transverse direction). In the case of biaxial stretching (also called biaxial orientation), the stretching can be simultaneous biaxial stretching, sequential stretching along one planar axis and then the other (e.g., first in the transverse direction and then in the machine direction), or multi-stage stretching (for instance, a combination of the simultaneous biaxial stretching and the sequential stretching).

The stretching magnification is not critical. In a form where monoaxial stretching is used, the linear stretching magnification can be, e.g., about 2 fold or more, or about 3 to about 30 fold. In a form where biaxial stretching is used, the linear stretching magnification can be, e.g., about 3 fold or more in any lateral direction. In another form, the linear magnification resulting from stretching is at least about 9 fold, or at least about 16 fold, or at least about 25 fold in area magnification.

The temperature of the multi-layer, gel-like sheet during stretching (namely the stretching temperature) is not critical. In one form, the temperature of the gel-like sheet during stretching can be about (Tm+10° C.) or lower, or optionally in a range that is higher than Tcd but lower than Tm, wherein Tm is the lesser of the melting point $Tm_1$ of the polyethylene in the first resin and the melting point $Tm_2$ of the polyethylene in the second resin.

The stretching when used generally makes it easier to produce a relatively high-mechanical strength multi-layer, microporous membrane with a relatively large pore size. Such multi-layer, microporous membranes are believed to be particularly suitable for use as battery separators.

Optionally, stretching can be conducted in the presence of a temperature gradient in a thickness direction (i.e., a direction approximately perpendicular to the planar surface of the multi-layer, microporous membrane) as described in JP 3,347,854 B2. In this case, it can be easier to produce a multi-layer, microporous membrane with improved mechanical strength.

Although it is not required, the multi-layer, gel-like sheet can be treated with a hot solvent. When used, it is believed that the hot solvent treatment provides the fibrils (such as those formed by stretching the multi-layer gel-like sheet) with a relatively thick leaf-vein-like structure. The details of this method are described in WO 2000/20493.

In one form, the dried multi-layer, microporous membrane can be stretched, at least monoaxially. The stretching method selected is not critical, and conventional stretching methods can be used such as by a tenter method, etc. When the multi-layer gel-like sheet has been stretched as described above the stretching of the dry multi-layer, microporous membrane can be called dry-stretching, re-stretching, or dry-orientation.

The temperature of the dry multi-layer, microporous membrane during stretching (the "dry stretching temperature") is not critical. In one form, the dry stretching temperature is approximately equal to the melting point Tm or lower, for example in the range of from about the crystal dispersion temperature Tcd to the about the melting point Tm. In one form, the dry stretching temperature ranges from about 90° C. to about 135° C., or from about 95° C. to about 130° C.

When dry-stretching is used, the stretching magnification is not critical. For example, the stretching magnification of the multi-layer, microporous membrane can range from about 1.1 fold to about 2.5 or about 1.1 to about 2.0 fold in at least one lateral (planar) direction.

In one form, the dried multi-layer, microporous membrane can be heat-treated. In one form, the heat treatment comprises heat-setting and/or annealing. When heat-setting is used, it can be conducted using conventional methods such as tenter methods and/or roller methods. Although it is not critical, the temperature of the dried multi-layer, microporous membrane during heat-setting (i.e., the "heat-setting temperature") can range from the Tcd to about the Tm.

Annealing differs from heat-setting in that it is a heat treatment with no load applied to the multi-layer, microporous membrane. The choice of annealing method is not critical, and it can be conducted, for example, by using a heating chamber with a belt conveyer or an air-floating-type heating chamber. Alternatively, the annealing can be conducted after the heat-setting with the tenter clips slackened. The temperature of the multi-layer, microporous membrane during annealing can range from about the melting point Tm or lower, from about 60° C. to (Tm−10° C.), or in a range of from about 60° C. to (Tm−5° C.).

In one form, the multi-layer, microporous membrane can be cross-linked (e.g., by ionizing radiation rays such as a-rays, (3-rays, 7-rays, electron beams, etc.) or can be subjected to a hydrophilic treatment (i.e., a treatment which makes the multi-layer, microporous membrane more hydrophilic (e.g., a monomer-grafting treatment, a surfactant treatment, a corona-discharging treatment, etc.))).

In another form, a second method for producing the multi-layer, microporous membrane comprises the steps of (1) combining (e.g., by blending) a first polyolefin composition and a membrane-forming solvent to prepare a first polyolefin solution in an extruder of the type disclosed herein, (2) combining a second polyolefin composition and a second membrane-forming solvent to prepare a second polyolefin solution in an extruder of the type disclosed herein, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) laminating the first and second gel-like sheet to form a multi-layer, gel-like sheet, (7) removing the membrane-forming solvent from the resultant multi-layer, gel-like sheet to form a solvent-removed gel-like sheet, and (8) drying the solvent-removed gel-like sheet in order to form the multi-layer, microporous membrane. An optional stretching step (9), and an optional hot solvent treatment step (10), etc., can be conducted between steps (5) and (6) or between steps (6) and (7), if desired. After step (8), an optional step (11) of stretching a multi-layer, microporous membrane, an optional heat treatment step (12), an optional cross-linking step with ionizing radiations (13), and an optional hydrophilic treatment step (14), etc., can be conducted.

The main difference between the second production method and the production method described hereinabove is in the order of the steps for laminating and cooling. In the previously described production method, laminating the first and second polyolefin solutions is conducted before the cooling step. In this production method, the first and second polyolefin solutions are cooled before the laminating step.

Steps (1), (2), (7) and (8) in this production method can be the same as the steps of (1), (2), (5) and (6) in the previously described production method. For the extrusion of the first polyolefin solution through the first die, the conditions of step (3) of the first production method can be used for step (3) of the second production method. For the extrusion of the second solution through the second die, the conditions of step (4) in the first production method can be the same as the conditions of step (3) in the second production method. In one form, either the first or second polyolefin solution is extruded through a third die. In this way, a multi-layer laminate can be formed having two layers produced from the first polyolefin solution and a single layer produced from the second polyolefin solution, or vice versa.

Step (5) of this production method can be the same as step (4) in the previously described production method, except that in the second production method the first and second gel-like sheets are formed separately.

Step (6) of laminating the first and second gel-like sheets will now be explained in more detail. The choice of lamination method is not particularly critical, and conventional lamination methods such as heat-induced lamination can be used to laminate the multi-layer gel-like sheet. Other suitable lamination methods include, for example, heat-sealing, impulse-sealing, ultrasonic-bonding, etc., either alone or in combination. Heat-sealing can be conducted using, e.g., one or more pair of heated rollers where the gel-like sheets are conducted through at least one pair of the heated rollers. Although the heat-sealing temperature and pressure are not particularly critical, sufficient heating and pressure should be applied for a sufficient time to ensure that the gel-like sheets are appropriately bonded to provide a multi-layer, microporous membrane with relatively uniform properties and little tendency toward delamination. In one form, the heat-sealing temperature can be, for instance, about 90° C. to about 135° C., or from about 90° C. to about 115° C. In another form, the heat-sealing pressure can be from about 0.01 MPa to about 50 MPa.

As is the case in the first production method, the thickness of the layers formed from the first and second polyolefin solution (i.e., the layers comprising the first and second microporous layer materials) can be controlled by adjusting the thickness of the first and second gel-like sheets and by the amount of stretching (stretching magnification and dry stretching magnification), when one or more stretching steps are used. Optionally, the lamination step can be combined with a stretching step by passing the gel-like sheets through multi-stages of heated rollers.

In one form, the second production method forms a multi-layer, polyolefin gel-like sheet having at least three layers. For example, after cooling, two extruded first polyolefin solutions and one extruded second polyolefin solution to form the gel-like sheets, the multi-layer gel-like sheet can be laminated with outer layers comprising the extruded first polyolefin solution and an intermediate layer comprising the extruded second polyolefin solution. In another form, after cooling two extruded second polyolefin solutions and one extruded first polyolefin solution to form the gel-like sheets, the multi-layer gel-like sheet can be laminated with outer layers comprising the extruded second polyolefin solution and an intermediate layer comprising the extruded first polyolefin solution.

The stretching step (9) and the hot solvent treatment step (10) can be the same as the stretching step (7) and the hot solvent treatment step (8) as described for the first production method, except stretching step (9) and hot solvent treatment step (10) are conducted on the first and/or second gel-like sheets. The stretching temperatures of the first and second gel-like sheets are not critical. For example, the stretching temperatures of the first gel-like sheet can be, e.g., $Tm_1+10°$ C. or lower, or optionally about $Tcd_1$ or higher but lower than about $Tm_1$. The stretching temperature of the second gel-like sheet can be, e.g., $Tm_2+10°$ C. or lower, or optionally about $Tcd_2$ or higher but lower than about $Tm_2$.

In another form, the stretching temperature of the first gel-like sheet ranges from about the crystal dispersion temperature $Tcd_1$ of the polyethylene in the first resin to $Tcd_1+25°$ C., or from about $Tcd_1+10°$ C. to $Tcd_1+25°$ C., or from about $Tcd_1+15°$ C. to $Tcd_1+25°$ C. The stretching temperature of the second gel-like sheet ranges from the crystal dispersion temperature $Tcd_2$ of the polyethylene in the second resin to about $Tcd_2+25°$ C., or about $Tcd_2+10°$ C. to $Tcd_2+25°$ C., or about $Tcd_2+15°$ C. to $Tcd_2+25°$ C.

In yet another form, a third method for producing the multi-layer, microporous membrane comprises the steps of (1) combining (e.g., by blending) a first polyolefin composition and a membrane-forming solvent to prepare a first polyolefin solution in an extruder of the type disclosed herein, (2) combining a second polyolefin composition and a second membrane-forming solvent to prepare a second polyolefin solution in an extruder of the type disclosed herein, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) removing the first and second membrane-forming solvents from the first and second gel-like sheets to form solvent-removed first and second gel-like sheets, (7) drying the solvent-removed first and second gel-like sheets to form at least one first polyolefin membrane and at least one second polyolefin membrane, and (8) laminating the first and second microporous membranes in order to form the multi-layer, microporous membrane.

A stretching step (9) and a hot solvent treatment step (10), etc., can be conducted between steps (5) and (6), if desired. A stretching step (11) and a heat treatment step (12), etc., can be conducted between steps (7) and (8), if desired. After step (8), a step (13) of stretching a multi-layer, microporous membrane, a heat treatment step (14), a cross-linking step with ionizing radiations (15) and a hydrophilic treatment step (16), etc., can be conducted if desired.

Steps (1) and (2) in the third production method can be conducted under the same conditions as steps of (1) and (2) in the first production method. Steps (3), (4), and (5) in the third production method can be conducted under the same conditions as steps (3), (4), and (5) in the second method. Step (6) in the third production method can be conducted under the same conditions as step (5) in the first production method except for removing the membrane-forming solvent from the first and second gel-like sheets. Step (7) in the third production method can be conducted under the same conditions as step (6) in the first production method except that in the third production method the first and second solvent-removed gel-like sheets are dried separately. Step (8) in the third production method can be conducted under the same conditions as the step (6) in the second production method except for laminating the first and second polyolefin microporous membranes. The stretching step (9) and the hot solvent treatment step (10) in the third production method can be conducted under the same conditions as step (9) and (10) in the second production method. The stretching step (11) and the heat treatment step (12) in the third production method can be conducted under the same conditions as steps (9) and (10) in the first production method except that in the third production method the first and second polyolefin microporous membranes are stretched and/or heat treated.

In one form, in the stretching step (11) in the third production method, the stretching temperature of the first microporous membrane can be about $Tm_1$ or lower, or optionally about $Tcd_1$ to about $Tm_1$, and the stretching temperature of the second microporous membrane can be about $Tm_2$ or lower, or optionally about $Tcd_2$ to about $Tm_2$.

In one form, the heat treatment step (12) in the third production method can be HS and/or annealing. For example, in the heat treatment step (12) in the third production method, the heat-setting temperature of the first polyolefin microporous membranes can be about $Tcd_1$ to about $Tm_1$, or optionally about the dry stretching temperature $+5°$ C., or optionally about the dry stretching temperature $\pm3°$ C. In one form, in the heat treatment step (12) in the third production method, the heat-setting temperature of the second microporous membrane can be about $Tcd_2$ to about $Tm_2$, or optionally the dry stretching temperature $\pm5°$ C., or optionally the dry stretching temperature $\pm3°$ C. When the HS is used, it can be conducted by, e.g., a tenter method or a roller method.

In one form, in the heat treatment step (12) in the third production method, the annealing temperature of the first microporous membrane can be about $Tm_1$ or lower, or optionally about 60° C. to about $(Tm_1-10°$ C.). In one form, in the heat treatment step (12) in the third production method, the annealing temperature of the second microporous membranes can be about $Tm_2$ or lower, or optionally about 60° C. to about $(Tm_2-10°$ C.).

The conditions in step (13), stretching a multi-layer, microporous membrane, a heat treatment step (14), a cross-linking step with ionizing radiations (15), and a hydrophilic treatment step (16) in the third production method can be the same as those for steps (9), (10), (11) and (12) in the first production method.

In still yet another form, a fourth production method for producing a multi-layer, microporous membrane is provided. The method comprises the steps of (1) combining (e.g., by blending) a first polyolefin composition and a membrane-forming solvent to prepare a first polyolefin solution in an extruder of the type disclosed herein, (2) combining a second polyolefin composition and a second membrane-forming solvent to prepare a second polyolefin solution in an extruder of the type disclosed herein, (3) coextruding the first and second polyolefin solutions through a die to form an extrudate, (4) cooling the extrudate to form a multi-layer, gel-like sheet, (5) removing the membrane-forming solvent from the multi-layer, gel-like sheet to form a solvent-removed gel-like sheet, and (6) drying the solvent-removed gel-like sheet in order to form the multi-layer, microporous membrane. An optional stretching step (7), and an optional hot solvent treatment step (8), etc. can be conducted between steps (4) and (5), if desired. After step (6), an optional step (9) of stretching a multi-layer, microporous membrane, an optional heat treatment step (10), an optional cross-linking step with ionizing radiations (11), and an optional hydrophilic treatment step (12), etc., can be conducted if desired. The order of the optional steps is not critical.

In this form, the first and second polyolefin solutions are co-extruded using a coextrusion die, wherein a planar surface of a first extrudate layer formed from the first polyolefin solution is in contact with a planar surface of a second extrudate layer formed from the second polyolefin solution. A planar surface of the extrudate can be defined by a first vector in the machine direction (MD) of the extrudate and a second vector in the transverse direction (TD) of the extrudate.

In one form, the first extruder containing the first polyolefin solution is connected to a second die section for producing a first skin layer and a third die section for producing a second skin layer, and a second extruder containing the second polyolefin solution is connected to a first die section for producing a core layer. The resulting layered extrudate can be co-extruded to form a three-layer extrudate comprising a first and a third layer constituting skin or surface layers produced from the first polyolefin solution; and a second layer constituting a core or intermediate layer of the extrudate situated between and in planar contact with both surface layers, where the second layer is produced from the second polyolefin solution.

While the extrusion has been described in terms of producing two and three-layer extrudates, the extrusion step is not limited thereto. For example, a plurality of dies and/or die assemblies can be used to produce multi-layer extrudates having four or more layers using the principles of the extrusion dies and methods disclosed herein.

An acceptable rate of polyolefin solution is obtained from section C11 when the pressure in the liquid paraffin injection section is less that the pressure in the preceding (upstream) section but greater than or equal to the pressure in the succeeding (downstream) cylinder section.

TABLE 1

| Example | Screw type | | C1 | C2 | C3 | C4 | C5 | C6 | C7 | C8 | C9 | C10 | C11 | Temp. C. | Rotation rpm | Relative Amount Mass % |
|---|---|---|---|---|---|---|---|---|---|---|---|---|---|---|---|---|
| A | FIG. 3 | LP *1 | | | 150 | | | | | | | | | 150~200 | 200 | 120 |
|   |        | Pressure *2 | 0 | 167 | 0 | 0 | 0 | 0 | 137 | 323 | 0 | 0 | 176 | | | |
| B | FIG. 3 | LP *1 | | | 130 | | 370 | | | | | | | 150~200 | 350 | 120 |
|   |        | Pressure *2 | 0 | 108 | 0 | 88 | 39 | 10 | 118 | 294 | 0 | 0 | 167 | | | |
| C | FIG. 3 | LP *1 | | | 80 | | 180 | | 240 | | | | | 150~200 | 350 | 100 |
|   |        | Pressure *2 | 0 | 118 | 0 | 98 | 0 | 39 | 0 | 20 | 0 | 0 | 186 | | | |
| D | FIG. 3 | LP *1 | | | 40 | | | | | | | | | 150~200 | 200 | 10 |
|   |        | Pressure *2 | 0 | 0 | 29 | 50 | 0 | 0 | 0 | 0 | 0 | 0 | 0 | | | |
| E | FIG. 4 | LP *1 | | | 150 | | | | | | | | | 150~200 | 200 | 120 |
|   |        | Pressure *2 | 10 | 0 | 0 | 0 | 0 | 0 | 0 | 194 | 484 | 0 | 0 | | | |
| F | FIG. 4 | LP *1 | 40 | | | | | | | | | | | 150~200 | 200 | 10 |
|   |        | Pressure *2 | 0 | 0 | 20 | 0 | 0 | 0 | 0 | 0 | 0 | 0 | 0 | | | |

*1 is the amount of liquid paraffin injected in mass percent, based on the mass of the polyolefin composition. A value of 100% means the mass of liquid paraffin solvent is equal to the mass of the polyolefin composition.
*2 is the pressure (in kPa) measured in each cylinder section of the extruder.

EXAMPLES

The examples and comparative examples below show mixing under defined conditions for (a) liquid paraffin solvent having a viscosity of 50 cSt at 40° C.; and (b) a polyolefin composition containing (i) 20% by mass of polyethylene having a weight-average molecular weight (Mw) of $2.0 \times 10^6$ and a molecular weight distribution (Mw/Mn) of 8, and (ii) 80% by mass of polyethylene having a weight-average molecular weight (Mw) of $3.5 \times 10^5$ and a molecular weight distribution (Mw/Mn) of 11.9.

The liquid paraffin and the polyolefin composition are combined in an extruder having a screw configuration to make a polyolefin solution. The extruder is a Model TEX 54 double-screw extruder obtained from Japan Steel Works of Tokyo, Japan.

To do this, the polyolefin composition is introduced into cylinder section C1 of the co-rotating, double-screw extruder and the liquid paraffin solvent is injected into at various positions along the extruder in various relative amounts. Referring to FIGS. 3 and 4, the temperature of each cylinder section C1-C11 in the extruder are all in the range 150° C. to 200° C. The screw type, rotation speed, solvent injection amount, and (kPa) measured at each section C1 through C11 are set out in the following table.

The relative amount of polyolefin solution produced from section C11 of the extruder (referenced to the amount obtained from Example D) appears in the last column of the Table 1. Examples A, B, C, and E relate to aspects disclosed herein, while Examples D and F are presented for comparison.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

What is claimed is:

1. A twin screw extruder for preparing a polymeric solution, the extruder comprising:
    (a) an elongated housing having an inlet end, an outlet end, an extruder shaft length L and a pair of interconnecting bores disposed within said housing;
    (b) a pair of elongated extruder shafts, each having an axis of rotation, said pair of elongated extruder shafts disposed within said pair of interconnecting bores and drivable in at least one direction of rotation;
    (c) a plurality of extruder screw segments positioned along said pair of elongated extruder shafts in a fixed angular relationship therewith, said plurality of extruder screw segments selected to form multiple extruder stages, said multiple extruder stages comprising an inlet stage, a mixing stage, an outlet stage, and a dispersion stage,
    (d) a material inlet adjacent said inlet end of said elongated barrel for introducing at least one polymer; and
    (e) a first fluid inlet located within said dispersion stage for introducing a solvent;

wherein:

the inlet stage has a length Li of about 10% L≤Li≤about 20% L, the dispersion stage has a length Ld of about 15% L≤Ld≤about 25% L, the mixing stage has a length Lm of about 35% L ≤Lm≤about 45 L, and the outlet stage has a length Lo of about 20% L≤Lo≤about 30% L;

the inlet stage comprises a first forward full flight screw segment having a length of 0.75 D, a second forward full flight screw segment having a length of 1.00 D, and six third forward full flight screw segments, each having a length of 0.75 D;

the dispersion stage comprises eleven forward kneading segments, each having a length of 0.50 D, and two neutral kneading segments, each having a length of 0.50 D;

the mixing stage comprises a full flight screw segment, having a length of 0.75 D, a pair of neutral kneading segments, each having a length of 0.50 D, a forward kneading segment having a length of 050 D, a plurality of gear kneading segments, each having a length of 1.50 D, and a plurality of forward kneading segments; and the outlet stage comprises five first forward full flight screw segments, each having a length of 1.5 D, and a second forward full flight screw segment having a length of 1.00 D and a pair of third full flight screw segments each having a length of 0.75 D.

2. The twin screw extruder of claim 1, further comprising a second fluid inlet located within said mixing stage for introducing a solvent.

3. The twin screw extruder of claim 1, wherein the axes of rotation are substantially parallel.

4. The twin screw extruder of claim 1, wherein said elongated extruder shafts are co-rotating.

5. The twin screw extruder of claim 1, wherein said elongated extruder shafts are counter-rotating.

* * * * *